(12) United States Patent
Lee et al.

(10) Patent No.: US 10,401,240 B2
(45) Date of Patent: Sep. 3, 2019

(54) SHEET FOR PRESSURE SENSOR, PRESSURE SENSOR, AND METHOD FOR PRODUCING SHEET FOR PRESSURE SENSOR

(71) Applicant: JAPAN SCIENCE AND TECHNOLOGY AGENCY, Kawaguchi-shi, Saitama (JP)

(72) Inventors: Sung Won Lee, Daegu (KR); Takao Someya, Tokyo (JP); Tsuyoshi Sekitani, Osaka (JP)

(73) Assignee: JAPAN SCIENCE AND TECHNOLOGY AGENCY, Kawaguchi-Shi (JP)

( * ) Notice: Subject to any disclaimer, the term of this patent is extended or adjusted under 35 U.S.C. 154(b) by 198 days.

(21) Appl. No.: 15/116,003

(22) PCT Filed: Feb. 5, 2015

(86) PCT No.: PCT/JP2015/053287
§ 371 (c)(1),
(2) Date: Aug. 2, 2016

(87) PCT Pub. No.: WO2015/119211
PCT Pub. Date: Aug. 13, 2015

(65) Prior Publication Data
US 2017/0167928 A1 Jun. 15, 2017

(30) Foreign Application Priority Data
Feb. 6, 2014 (JP) .................. 2014-021488

(51) Int. Cl.
*G01L 1/20* (2006.01)
*G01L 1/22* (2006.01)
*D01D 5/00* (2006.01)

(52) U.S. Cl.
CPC .......... *G01L 1/2268* (2013.01); *D01D 5/0084* (2013.01); *G01L 1/20* (2013.01); *G01L 1/2287* (2013.01)

(58) Field of Classification Search
CPC ................................ G01L 1/20; G01L 1/2268
See application file for complete search history.

(56) References Cited

U.S. PATENT DOCUMENTS

2003/0205450 A1 11/2003 Divigalpitiya et al.
2006/0144154 A1 7/2006 Ueno et al.
(Continued)

FOREIGN PATENT DOCUMENTS

CN 1650377 A 8/2005
CN 102032964 A 4/2011
(Continued)

OTHER PUBLICATIONS

State Intellectual Property Office of People's Republic of China, "First Office Action," issued in Chinese Patent Application No. 201580007199.3, which is a Chinese counterpart of U.S. Appl. No. 15/116,003, dated Mar. 30, 2018, 25 pages (15 pages of English Translation of Office Action, 10 pages of Office Action).
(Continued)

*Primary Examiner* — Jamel E Williams

(57) ABSTRACT

In order to provide a highly flexible and more highly sensitive ultrathin sheet for a pressure sensor, a pressure sensor, and a method for producing the sheet for a pressure sensor, a pressure sensor sheet (10) of the present invention is provided with a first electrode sheet (1a), a second electrode sheet (1b), and a flocculent pressure-sensitive conductive layer (3) composed of tangled conductive fibers (2) which is disposed between the first electrode sheet (1a) and the second electrode sheet (1b) and undergoes a change in resistance value when compressed, wherein the conductive fibers (2) extend along a direction parallel to the two
(Continued)

electrode sheets and are stacked in a perpendicular direction, and the conductive fibers that constitute the pressure-sensitive conductive layer have spaces provided therebetween.

17 Claims, 11 Drawing Sheets

(56) References Cited

U.S. PATENT DOCUMENTS

| | | | |
|---|---|---|---|
| 2009/0130301 A1 | 5/2009 | Bahnmuller et al. | |
| 2009/0254288 A1 | 10/2009 | Chase | |
| 2010/0162832 A1* | 7/2010 | Brauers | A61B 5/103 73/862.626 |
| 2010/0164478 A1 | 7/2010 | Miura | |
| 2011/0121688 A1* | 5/2011 | He | H01L 41/1132 310/338 |
| 2011/0181430 A1 | 7/2011 | Hu et al. | |
| 2012/0266685 A1 | 10/2012 | Choi | |
| 2012/0267563 A1 | 10/2012 | Capsal et al. | |
| 2013/0118267 A1* | 5/2013 | Suzuki | G01B 7/18 73/774 |

FOREIGN PATENT DOCUMENTS

| | | | | |
|---|---|---|---|---|
| CN | 102692288 A | | 9/2012 | |
| CN | 102717536 A | | 10/2012 | |
| CN | 103063332 A | | 4/2013 | |
| CN | 103208618 A | | 7/2013 | |
| JP | 57132033 A | * | 8/1982 | G01L 9/0002 |
| JP | S57-132033 A | | 8/1982 | |
| JP | 2004-125571 A | | 4/2004 | |
| JP | 2006-153471 A | | 6/2006 | |
| JP | 2008-170425 A | | 7/2008 | |
| JP | 2008170425 A | * | 7/2008 | |
| JP | 2010-014694 A | | 1/2010 | |
| JP | 2010-101827 A | | 5/2010 | |
| JP | 2010-537438 A | | 12/2010 | |
| JP | 2011-102457 A | | 5/2011 | |
| JP | 2012-028051 A | | 2/2012 | |
| JP | 2012-145447 A | | 8/2012 | |
| JP | 2013-068562 A | | 4/2013 | |
| JP | 2013-136141 A | | 7/2013 | |
| JP | 2013-195331 A | | 9/2013 | |
| KR | 10-2012-0009678 A | | 2/2012 | |
| TW | 201305543 A | | 2/2013 | |
| WO | 2011/065921 A1 | | 6/2011 | |
| WO | 2011/105837 A2 | | 9/2011 | |
| WO | 2013/168955 A1 | | 11/2013 | |

OTHER PUBLICATIONS

International Search Report received for PCT Patent Application No. PCT/JP2015/053287 dated Mar. 17, 2015, 6 pages (3 pages of English translation of International Search Report, 3 pages of International Search Report).

European Patent Office, "Extended European Search Report," issued in European Patent Application No. 15 746 322.5, which is a European counterpart of U.S. Appl. No. 15/116,003, dated Sep. 11, 2017, 8 pages.

China National Intellectual Property Administration, "The Second Office Action," issued in Chinese Patent Application 201580007199.3, which is a Chinese counterpart of U.S. Appl. No. 15/116,003, dated Nov. 19, 2018, 30 pages (19 pages of English translation of Office Action, and 11 pages of original Office Action).

European Patent Office, "Communication," issued in European Patent Application No. 15 746 322.5, which is a European counterpart of U.S. Appl. No. 15/116,003, dated Dec. 6, 2018, 6 pages.

* cited by examiner

SHEET FOR PRESSURE SENSOR, PRESSURE SENSOR, AND METHOD FOR PRODUCING SHEET FOR PRESSURE SENSOR

TECHNICAL FIELD

The present invention relates to a sheet for a pressure sensor, a pressure sensor, and a method for producing a sheet for a pressure sensor.

Priority is claimed on Japanese Patent Application No. 2014-021488, filed Feb. 6, 2014, the content of which is incorporated herein by reference.

BACKGROUND ART

Due to the flexibility of the materials used, flexible electronics produced using organic semiconductors can be fit to the outer surfaces or insides of the human body. Consequently, the use of flexible electronics to obtain biological information directly from cells or tissues has been garnering much attention in recent years.

Pressure sensors are attracting attention as one such application. A pressure sensor is a device that outputs an applied pressure as an electrical signal. Pressure sensors are widely used, for example, in artificial skin and robot operations and the like (Patent Document 1). These technologies continue to develop rapidly, and more precise data is now being demanded. In order to obtain more precise data, it is necessary for the pressure sensor to better fit the shape of the object being measured, and for the pressure sensor to be capable of better following movements such as bending and extending. Accordingly, thinner and more flexible pressure sensors are required.

In order to realize such pressure sensors, the types of investigations described below are being pursued.

Patent Document 2 discloses, as a simple matrix pressure-sensitive sensor, a pressure-sensitive sheet obtained by vertically and horizontally weaving a pressure-sensitive wire composed of a cylindrical elastic body, a conductive layer formed as a layer on the outer peripheral surface of the cylindrical elastic body, and a dielectric layer formed on top of the conductive layer.

Patent Document 3 discloses an active matrix pressure-sensitive sensor that uses electrodes, a pressure-sensitive conductive sheet and a transistor, and also discloses a pressure-sensitive conductive sheet in which graphite is added to a silicon rubber.

Patent Document 4 discloses a flexible pressure-sensitive sensor having a structure containing two or more layers, the sensor including a pressure-sensitive conductive sheet prepared by forming a resin coating film containing a conductive material on the surface of a rubber substrate. By using a structure containing two or more layers, the hysteresis of changes in the pressure-resistance can be improved.

PRIOR ART LITERATURE

Patent Documents

Patent Document 1: Japanese Unexamined Patent Application, First Publication No. 2013-136141
Patent Document 2: Japanese Unexamined Patent Application, First Publication No. 2008-170425
Patent Document 3: Japanese Unexamined Patent Application, First Publication No. 2013-068562
Patent Document 4: Japanese Unexamined Patent Application, First Publication No. 2012-145447

DISCLOSURE OF INVENTION

Problems to be Solved by the Invention

However, the pressure sensor sheets disclosed in Patent Documents 1 to 4 have thicknesses of several hundred μm to several mm. Accordingly, with these pressure sensor sheets, achieving satisfactory followability of objects having complex shapes or moving objects has been impossible, and precise data has been unobtainable. For example, the outer diameter of the cylindrical elastic body that acts as the substrate of the pressure-sensitive wire of the pressure sensor sheet disclosed in Patent Document 2 is 250 μmϕ. The document discloses that in order to enable the sheet to function as a pressure sensor sheet, the thickness of the overall pressure sensor must be greater than this outer diameter. Further, Patent Document 3 discloses that the thickness of just the rubber substrate that represents one portion of the pressure sensor sheet must be in the order of mm.

Further, because these pressure sensor sheets exhibit insufficient change in resistance value relative to applied pressure, a small change in pressure cannot be satisfactorily reflected as an output signal. In other words, these pressure sensor sheets have been unable to obtain high-sensitivity data. For example, FIG. 3 of Patent Document 2 discloses that the change in the resistance value relative to applied pressure is a mere several hundred kΩ.

When a pressure sensor sheet prepared by incorporating a conductive material in a rubber substrate or a resin coating film is used, not only does the resistance value change upon pressure changes in a direction perpendicular to the pressure sensor sheet, but the resistance value also changes when the pressure sensor sheet stretches in a direction parallel to the sheet. The important change in resistance value which it is desirable to measure occurs in accordance with pressure changes in a direction perpendicular to the pressure sensor sheet. In contrast, changes in the resistance value accompanying stretching in a parallel direction are noise. Accordingly, when a conventional pressure sensor sheet is used, variations in the measurement results occur between the state where the pressure sensor sheet is bent, and the state where the sheet is extended. In other words, these pressure sensor sheets have been unable to achieve high-sensitivity measurement of the pressure applied to objects having complex shapes or moving objects.

Moreover, active matrix pressure sensors require that a pressure-sensitive conductive layer and an electrode sheet are disposed on a transistor. However, because the pressure-sensitive conductive layer is formed from a black rubber, the bonding surface cannot be viewed visually following mounting of the pressure sensor. Further, when this type of pressure sensor sheet is mounted on a living body (for example, when mounted on the surface of the skin), the pressure-sensitive conductive layer, which is formed from an impermeable rubber, does not allow the transmission of moisture or air, and prevents heat dissipation by air flow. Accordingly, discomfort or inflammation of the skin or the like caused by lack of ventilation at the mounting location may sometimes occur.

The present invention has been developed in light of the above circumstances, and has an object of providing an ultra thin sheet for a pressure sensor having superior flexibility and higher sensitivity, as well as providing a pressure sensor and a method for producing the sheet for a pressure sensor.

Means for Solving the Problems

In order to achieve the above object, the present invention adopts the aspects described below.

(1) A sheet for a pressure sensor, including a first electrode sheet, a second electrode sheet, and a flocculent pressure-sensitive conductive layer composed of tangled conductive fibers which is disposed between the first electrode sheet and the second electrode sheet and undergoes a change in resistance value when compressed, wherein the conductive fibers extend along a direction parallel to the two electrode sheets and are stacked in a perpendicular direction, and the conductive fibers that constitute the pressure-sensitive conductive layer have spaces provided therebetween.

(2) The sheet for a pressure sensor according to (1), wherein the conductive fibers contain a conductive material dispersed in a polymer material.

(3) The sheet for a pressure sensor according to (2), wherein the conductive material is composed of a first conductive material and a second conductive material, the first conductive material is a filamentous conductive material, and the second conductive material is a particulate (including flake-like) conductive material.

(4) The sheet for a pressure sensor according to (3), wherein the first conductive material is carbon nanotubes or carbon nanohorns, and the second conductive material is graphene or carbon black.

(5) The sheet for a pressure sensor according to (3) or (4), wherein the mass ratio of the first conductive material within the conductive fibers is smaller than the mass ratio of the second conductive material.

(6) The sheet for a pressure sensor according to any one of (1) to (5), wherein among the conductive fibers that constitute the pressure-sensitive conductive layer, at least a portion of the fibers in those portions contacting the first electrode sheet or the second electrode sheet are bound to the first electrode sheet or the second electrode sheet.

(7) The sheet for a pressure sensor according to any one of (1) to (6), further containing a second pressure-sensitive conductive layer composed of tangled second conductive fibers between the pressure-sensitive conductive layer and the second electrode sheet, wherein at least a portion of the conductive fibers in those portions contacting the first electrode sheet are bound to the first electrode sheet, and at least a portion of the second conductive fibers in those portions contacting the second electrode sheet are bound to the second electrode sheet.

(8) The sheet for a pressure sensor according to (7), wherein the pressure-sensitive conductive layer and the second pressure-sensitive conductive layer are adhered together.

(9) The sheet for a pressure sensor according to any one of (2) to (7), wherein the polymer material is an elastomer.

(10) The sheet for a pressure sensor according to any one of (1) to (9), wherein the first electrode sheet and the second electrode sheet are transparent electrodes.

(11) The sheet for a pressure sensor according to any one of (1) to (10), wherein the pressure-sensitive conductive layer, when viewed from a direction perpendicular to the electrode sheets, has spaces in which no conductive fibers exist.

(12) The sheet for a pressure sensor according to any one of (1) to (11), wherein the diameter of the conductive fibers is smaller than the thickness of the first electrode sheet and the second electrode sheet.

(13) The sheet for a pressure sensor according to any one of (1) to (12), wherein the diameter of the conductive fibers is within a range from 100 nm to 10 µm.

(14) The sheet for a pressure sensor according to any one of (1) to (13), wherein the thickness of the pressure-sensitive conductive layer is smaller than the combined thickness of the first electrode sheet and the second electrode sheet.

(15) The sheet for a pressure sensor according to any one of (1) to (14), wherein the thicknesses of the first electrode sheet and the second electrode sheet are substantially equal.

(16) The sheet for a pressure sensor according to any one of (1) to (15), wherein the first electrode sheet or the second electrode sheet has air permeability.

(17) The sheet for a pressure sensor according to any one of (1) to (16), wherein the thickness of the pressure-sensitive conductive layer is at least 2 times, but not more than 100 times, the diameter of the conductive fibers.

(18) The sheet for a pressure sensor according to any one of (1) to (17), wherein the thickness of the pressure-sensitive conductive layer is within a range from 0.5 µm to 100 µm.

(19) The sheet for a pressure sensor according to any one of (1) to (18), wherein non-conductive fibers are mixed within the pressure-sensitive conductive layer.

(20) A pressure sensor, wherein at least one electrode among the first electrode sheet and the second electrode sheet of the sheet for a pressure sensor according to any one of (1) to (19) is connected to a transistor.

(21) A method for producing the sheet for a pressure sensor according to any one of (1) to (19), the method including jetting a dispersion-based liquid containing a polymer material and a conductive material onto a first electrode sheet using an electrospinning deposition method, thereby forming a pressure-sensitive conductive layer composed of tangled conductive fibers.

(22) A method for producing a sheet for a pressure sensor, the method including a first step of mixing a first conductive material and an ionic liquid with a solvent to obtain a first dispersion system in which the first conductive material is dispersed within the solvent, a second step of mixing a second conductive material with a solvent to obtain a second dispersion system in which the second conductive material is dispersed within the solvent, a third step of mixing the first dispersion system and the second dispersion system to obtain a third dispersion system, a fourth step of adding a polymer material to the third dispersion system and stirring to obtain a fourth dispersion system, and a fifth step of jetting the fourth dispersion system onto a first electrode sheet using an electrospinning deposition method, thereby forming a pressure-sensitive conductive layer composed of tangled conductive fibers.

(23) The method for producing a sheet for a pressure sensor according to (21) or (22), further including a step of jetting a dispersion-based liquid containing the polymer material and the conductive material onto a second electrode sheet using an electrospinning deposition method, thereby forming a second pressure-sensitive conductive layer composed of tangled conductive fibers, and a step of binding the pressure-sensitive conductive layer and the second pressure-sensitive conductive layer.

Effects of the Invention

The sheet for a pressure sensor according to one aspect of the present invention includes a first electrode sheet, a second electrode sheet, and a flocculent pressure-sensitive conductive layer composed of tangled conductive fibers which is disposed between these electrode sheets and undergoes a change in resistance value when compressed. The conductive fibers extend along a direction parallel to the electrode sheets, and are stacked in a perpendicular direction. Further, spaces exist between the conductive fibers that constitute the pressure-sensitive conductive layer. When the pressure applied to the pressure sensor sheet changes, the density of the flocculent tangled conductive fibers changes, and changes occur in the state of the stacking of the conductive fibers. When this stacking state changes, the resistance value between the first electrode sheet and the second electrode sheet changes. The conductive fibers have anisotropy in the direction parallel to, and in the direction perpendicular to, the two electrode sheets. The change in the resistance value in the stacking direction is extremely large relative to external forces in the perpendicular thickness direction, whereas the change in the resistance value caused by strain in the parallel direction is extremely small. When the sheet for a pressure sensor is subjected to a bending deformation, because the strain caused by the bending deformation is in a direction parallel to the electrode sheets, the change in resistance value caused by the bending deformation is small. In other words, measurement noise is minimal, meaning high-precision measurements are possible.

In the sheet for a pressure sensor according to one aspect of the present invention, the conductive fibers may be prepared by dispersing a conductive material in a polymer material. Further, the conductive fibers may be composed of a polymer material having a first conductive material and a second conductive material dispersed therein, wherein this first conductive material is a filamentous conductive material, and the second conductive material is a particulate (including flake-like) conductive material. The filamentous first conductive material electrically connects particles of the particulate second conductive material within the polymer material. When a weak pressure acts upon the pressure sensor sheet, the conductivity through the filamentous first conductive material changes, causing a reduction in the resistance value of the conductive fibers. As a result of this effect, the sensor sensitivity at low pressures and the stability of the sensor sensitivity can be improved. The filamentous first conductive material also has a secondary effect of improving the dispersion stability of the particulate second conductive material in the fiber production process.

Moreover, ensuring that the mass ratio of the first conductive material in the conductive fibers is smaller than the mass ratio of the second conductive material enables an extremely large dynamic range for the change in resistance value upon pressure application. This is because by dispersing the second conductive material in a large mass ratio, a large reduction in the resistance value can be obtained when a high pressure acts upon the sheet.

In the sheet for a pressure sensor according to one aspect of the present invention, the first conductive material may be carbon nanotubes or carbon nanohorns, and the second conductive material may be graphene or carbon black. Conductive materials formed from carbon exhibit superior durability relative to oxygen and moisture, and are most suited to pressure-sensitive conductive layers composed of fibers having a high specific surface area.

In the sheet for a pressure sensor according to one aspect of the present invention, at least a portion of the conductive fibers that constitute the pressure-sensitive conductive layer in those portions contacting the first electrode sheet or the second electrode sheet may be bound to the first electrode sheet or the second electrode sheet. If the state of the connection between the conductive fibers and the electrode sheets is unstable, then considerable noise can occur during measurements under weak pressure. By ensuring that at least a portion of the conductive fibers are bound to the electrode sheets, the state of the electrical connection becomes extremely stable, making low-noise measurements possible.

The sheet for a pressure sensor according to one aspect of the present invention may further contain a second pressure-sensitive conductive layer composed of tangled second conductive fibers between the pressure-sensitive conductive layer and the second electrode sheet, wherein at least a portion of the conductive fibers in those portions contacting the first electrode sheet may be bound to the first electrode sheet, and at least a portion of the second conductive fibers in those portions contacting the second electrode sheet may be bound to the second electrode sheet. Because the two pressure-sensitive conductive layers are each bound to one of the electrode sheets, the state of the connection between the pressure-sensitive conductive layers and the electrodes is stable, making low-noise measurements possible. Moreover, by adhering the two pressure-sensitive conductive layers together, the structural and electrical states of the pressure-sensitive conductive layers between the two electrode sheets become highly stable. As a result, measurements of even lower noise become possible.

In the sheet for a pressure sensor according to one aspect of the present invention, an elastomer may be used as the polymer material of the conductive fibers. Elastomers are flexible, and undergo extremely minimal changes in mechanical properties, even when exposed to repeated large strain. When pressure acts upon the sheet, large strain develops in the overlapping portions of the fibers, but by using an elastomer as the base material, a sheet for a pressure sensor having a combination of superior flexibility and superior durability can be obtained.

In the sheet for a pressure sensor according to one aspect of the present invention, the first electrode sheet and the second electrode sheet may be transparent electrodes. The flocculent pressure-sensitive conductive layer exhibits light transmissivity, and therefore by making the two electrode sheets transparent, a pressure sensor sheet that can transmit light can be realized. As a result, the location of pressure measurement can be observed through the pressure sensor sheet. Further, the development of various other measurements becomes possible, such as simultaneously performing the pressure measurement and a measurement of light from above the pressure sensor sheet. Moreover, in order to enhance the light transmissivity of the pressure sensor sheet, it is preferable that when the sheet is viewed from a direction perpendicular to the electrode sheets, spaces exist between the conductive fibers that constitute the pressure-sensitive conductive layer. The presence of these spaces increases the light transmittance, and reduces light scattering, making observation and measurement even easier.

In the sheet for a pressure sensor according to one aspect of the present invention, the diameter of the conductive fibers may be smaller than the thickness of the first electrode sheet and the second electrode sheet. If the diameter of the conductive fibers is greater than the thickness of the electrode sheets, then localized deformations of the electrode sheets tend to develop more easily along the surfaces of the conductive fibers. If the electrode sheets become prone to localized deformation, then the state of contact between the conductive fibers and the electrode sheets upon pressure application can become irregular. Ensuring that the diameter of the conductive fibers is smaller than the thickness of the first electrode sheet and the second electrode sheet enables suppression of any fluctuations in the change in the resistance value under pressure that may be caused by this type of irregularity in the contact state.

In the sheet for a pressure sensor according to one aspect of the present invention, the diameter of the conductive fibers may be within a range from 100 nm to 10 µm. Fine conductive fibers undergo a large change in contact state under pressure, and are therefore highly sensitive. In contrast, the resistance change in thick conductive fibers under pressure is of low sensitivity. Extremely fine conductive fibers have low strength, whereas extremely thick conductive fibers have high rigidity. Accordingly, by ensuring that the diameter of the conductive fibers is within the above range, a combination of sensitivity and flexibility can be achieved.

In the sheet for a pressure sensor according to one aspect of the present invention, the thickness of the pressure-sensitive conductive layer may be smaller than the combined thickness of the first electrode sheet and the second electrode sheet, and is preferably smaller than the thickness of the first electrode sheet and the second electrode sheet. In order to achieve excellent flexibility, and enable accurate pressure measurements to be performed at low noise even when the sheet is subjected to bending deformation, the rigidity of the sheet relative to bending must be suppressed to low levels, and the stress on the electrodes must also be suppressed. In a pressure sensor sheet composed of a pressure-sensitive conductive layer sandwiched between two electrode sheets, the sheet rigidity increases dramatically as the pressure-sensitive conductive layer becomes thicker. Further, the stress at the interfaces between the pressure-sensitive conductive layer and the electrode sheets also increases, meaning the stable connection between the conductive fibers and the electrodes is more easily destroyed. By ensuring that the thickness of the pressure-sensitive conductive layer is smaller than the combined thickness of the two electrode sheets, unexpected faults during flexion of the electrode sheets and changes in the precision can be suppressed to low levels. This is because the strain at the interfaces between the conductive fibers and the electrode sheets is suppressed to approximately half of the strain at the electrode sheet outer surfaces. Moreover, if the thickness of the pressure-sensitive conductive layer is smaller than the thickness of the first electrode sheet and the second electrode sheet, then strain at the connection portions between the conductive fibers and the electrodes can be kept as low as possible. If the thicknesses of the first electrode sheet and the second electrode sheet are substantially equal, then the strain acting upon the pressure-sensitive conductive layer when bending is performed can be reduced as far as possible, and the occurrence of errors in the pressure measurements due to the bending can be largely suppressed.

In the sheet for a pressure sensor according to one aspect of the present invention, the first electrode sheet or the second electrode sheet may have air permeability. If both sides of the pressure-sensitive conductive layer are sealed with electrode sheets having no air permeability, then air is trapped inside the sealed space. This sealed air contracts and expands as the temperature changes, generating pressure inside the sheet. This internal pressure causes changes in the resistance value of the pressure-sensitive conductive layer, resulting in measurement errors. Further, even in the step of crimping the electrode sheets, the internal air is compressed, leading to measurement errors. By ensuring that the electrode sheets have air permeability, this internal pressure can be released, and measurement errors can be prevented from occurring.

Both the first electrode sheet and the second electrode sheet may have air permeability. By imparting both electrode sheets with air permeability, in addition to using an air-permeable pressure-sensitive conductive layer, the entire pressure sensor sheet can be imparted with air permeability. As a result, when the sensor sheet is affixed to the surface of sweaty skin or the like, moisture from the skin or the like is able to dissipate. Accordingly, pressure errors caused by moisture from the skin or the like acting against the body surface can be suppressed, meaning more precise measurements can be performed. This type of configuration enables a measurement system to be developed that causes no discomfort and suffers no defects even during long-term installation.

In the sheet for a pressure sensor according to one aspect of the present invention, the thickness of the pressure-sensitive conductive layer may be at least 2 times, but not more than 100 times, the diameter of the conductive fibers. The pressure-sensitive conductive layer undergoes a reduction in the resistance value when the contact between the conductive fibers increases due to pressure. This contact between the conductive fibers is one of the principles that enables the pressure to be measured as a resistance value. Accordingly, it is necessary that the thickness of the pressure-sensitive conductive layer is a thickness corresponding with 2 layers, or 3 layers or more, of the conductive fibers. In other words, the thickness of the pressure-sensitive conductive layer must be at least 2 times the diameter of the conductive fibers. By increasing the number of overlapping layers of the conductive fibers, the number of contacts between the conductive fibers increases, and localized fluctuations in the resistance value across the electrode sheets can be suppressed. On the other hand, increasing the number of stacked layers also causes an increase in the bending rigidity of the pressure sensor sheet and an increase in the resistance value. By ensuring that the thickness of the pressure-sensitive conductive layer is not more than 100 times the diameter of the conductive fibers, the size of the resistance value, the measurement precision of the resistance value, and the mechanical rigidity can be kept within suitable ranges. By ensuring that the thickness of the pressure-sensitive conductive layer is not more than 100 µm, a flexible sheet for a pressure sensor can be produced.

In the sheet for a pressure sensor according to one aspect of the present invention, non-conductive fibers may be mixed into the pressure-sensitive conductive layer. Methods that may be used to lower the sensitivity of the pressure sensor sheet and enable measurements to be performed up to high pressure include a method in which the mass ratio of the conductive material is lowered, and a method in which the conductive fibers are thickened to increase the rigidity. However, reducing the mass ratio makes it difficult to obtain uniform resistance values. On the other hand, if the fibers are thickened, then the flexibility of the pressure sensor sheet tends to be lost. Accordingly, by mixing non-conductive fibers, the relationship between the pressure and the resistance value can be controlled with good precision. By mixing non-conductive fibers, a pressure sensor sheet can be prepared that best matches the changes in pressure that are to be measured, meaning the sheets can be applied in all manner of applications.

In the sheet for a pressure sensor according to one aspect of the present invention, at least one electrode among the first electrode sheet and the second electrode sheet is connected to a transistor. A pressure sensor sheet having high flexibility is suited to measurements on surfaces having fine undulations. Accordingly, in order to enable measurement of a pressure distribution with high spatial resolution, the electrodes are divided into a multitude of segments, with a plurality of measurement points disposed on a single pressure sensor sheet. In order to enable the plurality of electrode segments to be arranged in a matrix, switching of each of the electrode segments with a transistor is effective. This enables a highly functional pressure sensor to be obtained.

In a method for producing a sheet for a pressure sensor according to one aspect of the present invention, a dispersion-based liquid containing a polymer material and a conductive material is jetted onto the electrode sheet using an electrospinning deposition method, thereby forming a pressure-sensitive conductive layer composed of tangled conductive fibers. The electrospinning method enables the conductive fibers to be bound to the electrode sheet without using any special adhesive or performing any special process. Accordingly, the electrospinning method is ideal for forming a pressure-sensitive conductive layer composed of very fine fibers.

A method for producing a sheet for a pressure sensor according to one aspect of the present invention includes a first step of mixing a first conductive material and an ionic liquid with a solvent to obtain a first dispersion system in which the first conductive material is dispersed within the solvent, a second step of mixing a second conductive material with a solvent to obtain a second dispersion system in which the second conductive material is dispersed within the solvent, a third step of mixing the first dispersion system and the second dispersion system to obtain a third dispersion system, a fourth step of adding a polymer material to the third dispersion system and stirring to obtain a fourth dispersion system, and a fifth step of jetting the fourth dispersion system onto a first electrode sheet using an electrospinning deposition method, thereby forming a pressure-sensitive conductive layer composed of tangled conductive fibers. By using this method, the first conductive material and the second conductive material can be dispersed uniformly through the conductive fibers.

In particular, by preparing the first dispersion system and the second dispersion system separately, the first conductive material and the second conductive material can be dispersed even more uniformly. In the fourth step, by first synthesizing the third dispersion system in which the first conductive material and the second conductive material have been uniformly dispersed, and subsequently adding the polymer material, the conductive materials can be dispersed more uniformly through the conductive fibers. In contrast, if the polymer material is first dissolved in the solvent, and the first conductive material and the second conductive material are then added, then the viscosity of the solution increases upon dissolution of the polymer material, making uniform dispersion of the conductive materials impossible. Moreover, by using an electrospinning deposition method in the fifth step, the fourth dispersion system is pulled strongly by a powerful voltage, and therefore the first conductive material and the second conductive material can be dispersed even more uniformly within the conductive fibers.

A method for producing a sheet for a pressure sensor according to one aspect of the present invention may include a step of forming a flocculent pressure-sensitive conductive layer composed of tangled first conductive fibers on a first electrode sheet, a step of forming a flocculent second pressure-sensitive conductive layer composed of tangled second conductive fibers on a second electrode sheet, and a step of binding together the pressure-sensitive conductive layer and the second pressure-sensitive conductive layer. By reliably binding each of the electrode sheets to conductive fibers, and subsequently binding together the first pressure-sensitive conductive layer and the second pressure-sensitive conductive layer, a pressure sensor sheet that is both structurally and electrically stable can be produced. In particular, a method in which the conductive fibers are stacked on the electrode sheets using an electrospinning deposition method enables the conductive fibers to be bound without using any special adhesive process, resulting in an extremely stable yet rapid production method.

BEST MODE FOR CARRYING OUT THE INVENTION

Figure 1:
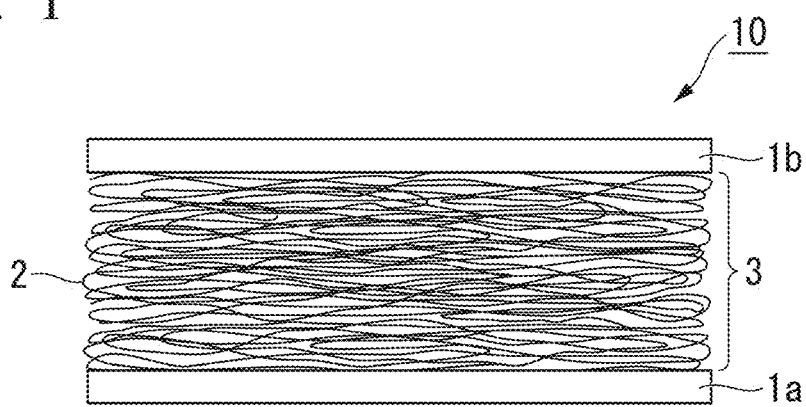
FIG. 1 is a schematic cross-sectional view schematically illustrating a sheet for a pressure sensor according to an embodiment of the present invention.

The sheet for a pressure sensor, the pressure sensor and the method for producing a sheet for a pressure sensor according to the present invention are described below using the drawings. In the drawings used in the following descriptions, portions that illustrate characteristic features may be shown enlarged in order to facilitate understanding of those features, and the dimensional ratios between the various constituent elements may not necessarily be the same as the actual ratios. The materials and dimensions and the like mentioned in the following descriptions are merely examples, in no way limit the present invention, and may be changed as appropriate within the scope of the present invention. The pressure sensor sheet and the pressure sensor according to the present invention may also include constituent elements such as layers that are not mentioned in the following description, provided they do dot impair the effects of the present invention.

(Sheet for a Pressure Sensor)

Figure 2:
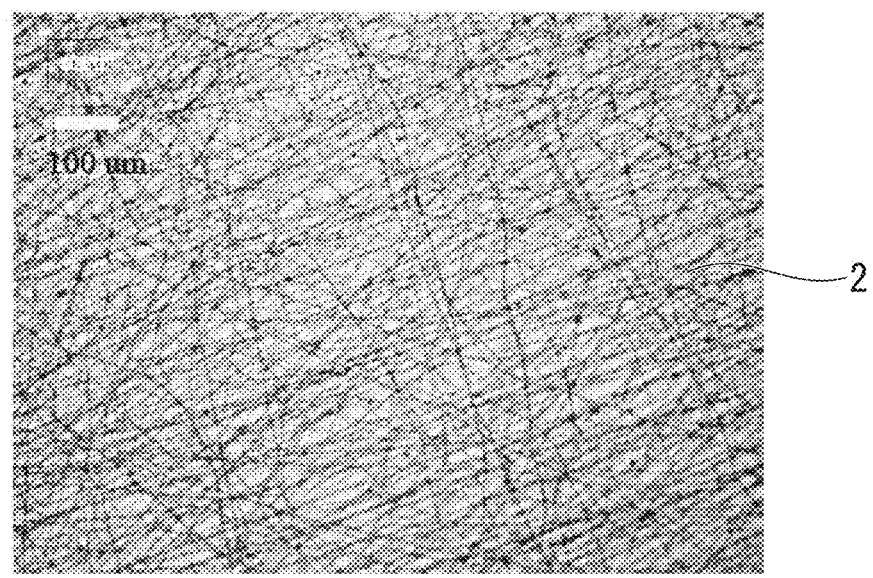
FIG. 2 is an optical microscope photograph illustrating a planar view of a pressure-sensitive conductive layer according to an embodiment of the present invention.

FIG. 1 is a drawing schematically illustrating a cross-section of a sheet for a pressure sensor according to an embodiment of the present invention. FIG. 2 is an optical microscope photograph illustrating a planar view of a pressure-sensitive conductive layer according to an embodiment of the present invention.

A pressure-sensitive film according to an embodiment of the present invention is described below using FIG. 1 and FIG. 2. A pressure sensor sheet 10 includes a first electrode sheet 1a, a second electrode sheet 1b, and a flocculent pressure-sensitive conductive layer 3 composed of tangled conductive fibers 2, which is disposed between the first electrode sheet 1a and the second electrode sheet 1b and undergoes a change in resistance value when compressed. The conductive fibers 2 extend along a direction parallel to the two electrode sheets, and are stacked in the perpendicular direction. The pressure-sensitive conductive layer 3 has spaces between the conductive fibers 2 that constitute the layer. The conductive fibers may be a polymer material having a conductive material dispersed therein. The conductive material may be composed of one type or a plurality of types of fine particles. The term fine particles refers to nano-size nanomaterials or pico-size picomaterials, and means particles smaller than millimeter size.

When a pressure is applied to the pressure sensor sheet 10, the flocculent pressure-sensitive conductive layer 3 composed of the tangled conductive fibers 2 is compressed, and therefore the conductive fibers 2 overlap in a dense arrangement. As a result, the contact surface area between the conductive fibers 2 and the first electrode sheet 1a and the second electrode sheet 1b increases. Moreover, the shapes of the conductive fibers 2 themselves also undergo deformation. In contrast, when the pressure is weakened, the overlaps of the conductive fibers 2 become more sparse, the contact surface area between the conductive fibers 2 and the first electrode sheet 1a and the second electrode sheet 1b decreases, and the shapes of the conductive fibers 2 return to their original state. In the pressure sensor sheet 10, the changes in pressure are measured by the change in the resistance value between the first electrode sheet 1a and the second electrode sheet 1b that accompanies the above changes. In other words, in the pressure sensor sheet 10, there are many factors that contribute to the change in resistance value, and the sheet can respond with good sensitivity even to extremely small changes in the applied pressure.

Figure 3:
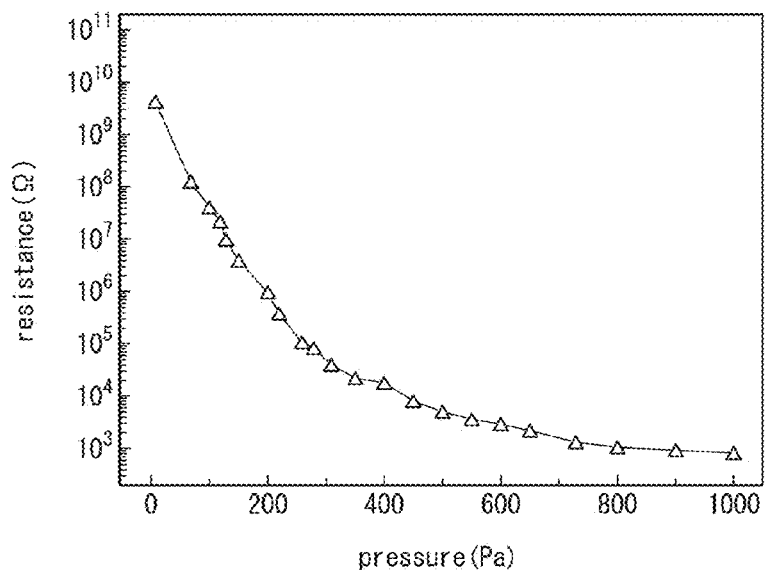
FIG. 3 is a graph illustrating the change in the resistance value relative to the pressure applied to a sheet for a pressure sensor according to an embodiment of the present invention.

FIG. 3 is a graph illustrating the change in the resistance value relative to the pressure applied to the pressure sensor sheet 10.

In a state where no pressure is applied, the conductive fibers 2 only overlap weakly, and therefore the pressure sensor sheet 10 exhibits almost no conductivity, with a resistance value in the order of $10^{10}$ Ω between the first electrode sheet 1a and the second electrode sheet 1b. On the other hand, when pressure is applied, the overlaps between the conductive fibers 2 strengthen, and the pressure sensor sheet 10 exhibits a resistance value in the order of $10^2$ Ω between the first electrode sheet 1a and the second electrode sheet 1b. This is because the contact surface area between the conductive fibers 2 and the first electrode sheet 1a and the second electrode sheet 1b increases. In other words, the pressure sensor sheet 10 exhibits changes in the resistance value across a broad range from the order of $10^2$ Ω to the order of $10^{10}$ Ω.

In this pressure sensor sheet 10, the change in the resistance value upon application of a weak pressure of 0 to 200 Pa is extremely marked. In other words, the pressure sensor sheet 10 can function as a sensor with high sensitivity even relative to small pressure changes.

As illustrated in the optical microscope photograph of FIG. 2, the conductive fibers 2 extend mainly along directions perpendicular to the direction of pressure application. In other words, in FIG. 1 which illustrates the pressure sensor sheet 10 from a cross-sectional view, the conductive fibers 2 are aligned mainly in parallel with the two electrode sheets. As a result, even if the pressure sensor sheet 10 is pulled widthwise to some extent in a direction parallel to the electrode sheets, no significant change occurs in the resistance value. Accordingly, the pressure sensor sheet 10 enables changes in the pressure to be measured with high sensitivity.

In the pressure sensor sheet 10, because the response does not change greatly relative to expansion and contraction in directions parallel to the two electrode sheets, substantially the same response can be obtained in the case where pressure is applied in a bent state, and the case where pressure is applied in an extended state. In other words, the pressure sensor sheet 10 can perform high-precision measurements with minimal measurement noise even for pressure changes in dynamic regions. This type of high-precision measurement has been impossible to achieve with good sensitivity using conventional pressure sensor sheets formed, for example, by dispersing conductive particles in a rubber.

Figure 4:
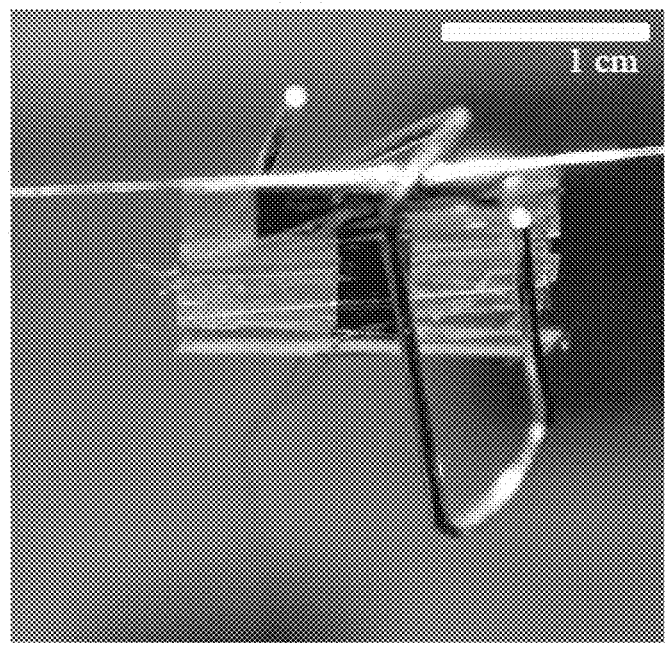
FIG. 4 is a photograph of a state in which a sheet for a pressure sensor according to an embodiment of the present invention has been folded completely in two, and a weight then placed on top of the sheet.
Figure 5:
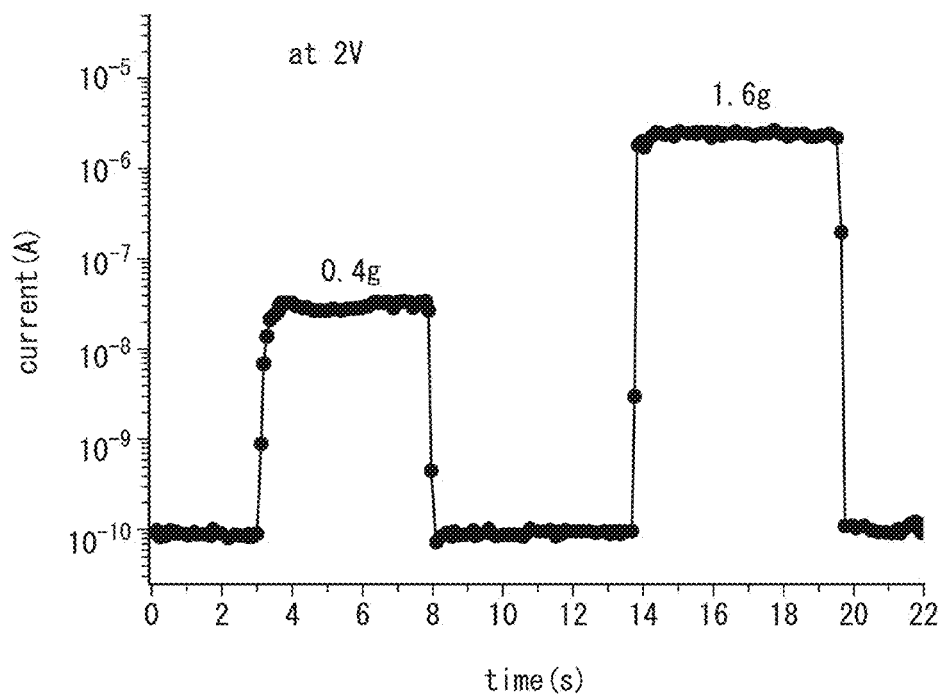
FIG. 5 is a graph measuring the change in current flow when a sheet for a pressure sensor according to an embodiment of the present invention is folded, and the pressure applied to the sheet for a pressure sensor is changed.

FIG. 4 is a photograph showing a state in which pressure sensor sheet has been folded and a weight has then been placed on top of the sheet. FIG. 5 is a graph illustrating the change in resistance value when the weight shown in FIG. 4 is removed.

During the measurements of FIG. 5, a voltage of 2 V was applied between the two electrode sheets. In the measurements of FIG. 5, a 0.4 g weight was placed on the pressure sensor sheet 3 seconds after the start of measurements, and this 0.4 g weight was removed from the pressure sensor sheet 8 seconds after the start of measurements. Then, a 1.6 g weight was placed on the pressure sensor sheet 14 seconds after the start of measurements, and this 1.6 g weight was removed from the pressure sensor sheet 20 seconds after the start of measurements.

As illustrated in FIG. 5, a change in the resistance value of the pressure sensor sheet 10 occurs even when a pressure is applied with the sheet in a folded state. Further, there is a difference in the amount of current flow for the placements of the 0.4 g weight and the 1.6 g weight, indicating that the pressure sensor sheet 10 is able to detect even small differences in pressure.

As shown in the optical microscope photograph of FIG. 2, when viewed from a direction perpendicular to each of the electrode sheets, the conductive fibers 2 are tangled with spaces therebetween. As a result, light can pass through those spaces. Observation of the surface state while a pressure is being applied, measurements using light, or the application of light-based stimulus can be performed at the same time as the pressure application.

Figure 6A:
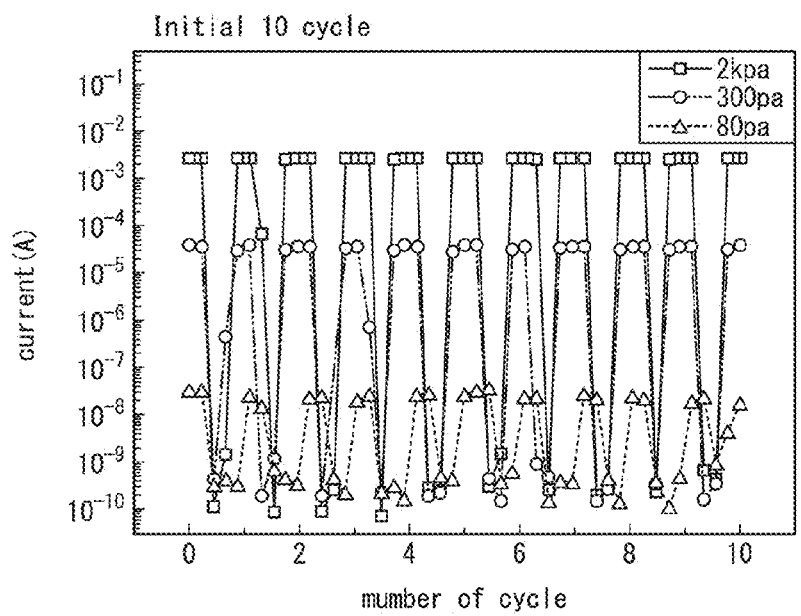
FIG. 6A illustrates the measurement results for the first 10 cycles when a pressure of 2 kPa, 300 Pa or 80 Pa is applied repeatedly for 1,000 cycles to a sheet for a pressure sensor according to an embodiment of the present invention.
Figure 6B:
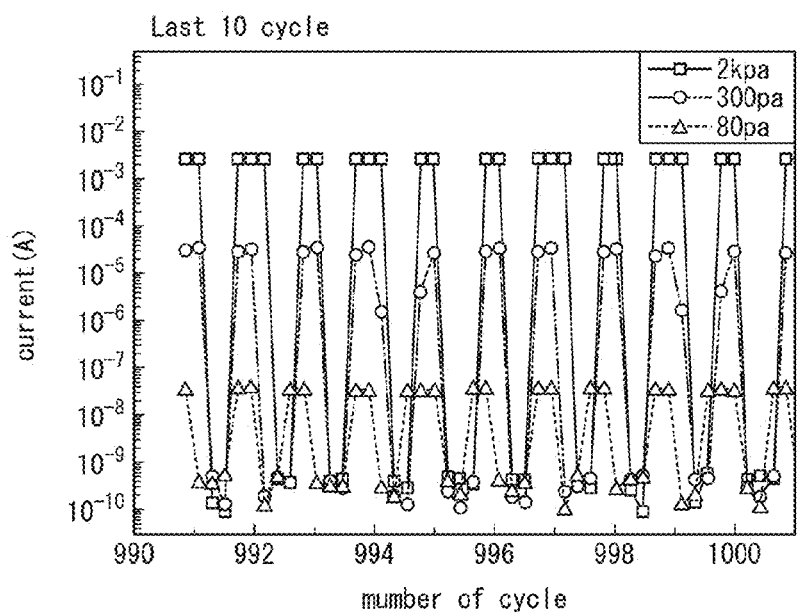
FIG. 6B illustrates the measurement results for the last 10 cycles when a pressure of 2 kPa, 300 Pa or 80 Pa is applied repeatedly for 1,000 cycles to a sheet for a pressure sensor according to an embodiment of the present invention.

FIG. 6A and FIG. 6B illustrate the results when a pressure of 2 kPa, 300 Pa or 80 Pa is applied repeatedly for 1,000 cycles to the pressure sensor sheet 10. FIG. 6A represents the results for the first 10 cycles, and FIG. 6 B represents the results for the last 10 cycles. The results of FIGS. 6A and 6B indicate that no significant difference in the signal intensity occurs between the first 10 cycles and the last 10 cycles. In other words, the pressure sensor sheet 10 has superior repetition reproducibility.

There are no particular limitations on the first electrode sheet 1a and the second electrode sheet 1b. For example, a stretched sheet prepared by a method such as metal rolling may be used, or a sheet prepared by using vacuum deposition or sputtering or the like to form a layer of a metal or a transparent electrode or the like on a thin-film substrate may be used. For the transparent electrode, typically used materials such as ITO, IZO and AZO may be used. A transparent electrode may also be formed by forming an extremely thin film of metal by vacuum deposition or sputtering or the like.

The first electrode sheet 1a and the second electrode sheet 1b are preferably transparent electrodes. As described above, the conductive fibers 2 have spaces therebetween, allowing the transmission of light. Accordingly, by making the electrodes transparent, a pressure sensor sheet that transmits light can be obtained. This enables the location of the pressure measurement to be observed through the pressure sensor sheet. Further, the development of numerous other measurements becomes possible, such as simultaneously performing the pressure measurement and a measurement of light from above the pressure sensor sheet.

In those cases where a metal or a transparent electrode or the like is formed on a film substrate by vacuum deposition or sputtering or the like, the thickness of the film substrate is preferably at least 1 µm but not more than 15 µm, and is more preferably at least 1 µm but not more than 5 µm. Provided the film substrate is at least 1 µm, the film substrate can be produced stably, and sufficient film strength can be achieved. On the other hand, provided the thickness is not more than 15 µm, the pressure sensor sheet 10 exhibits substantially the same resistance value when the metal sheet is bent, and when the metal sheet is extended from a bent state using the same bend radius. Accordingly, a pressure sensor sheet 10 can be obtained that can satisfactorily accommodate operations such as bending and extending. Moreover, provided the thickness is not more than 5 µm, the pressure sensor sheet 10 exhibits almost no change in the resistance value between a bent state and an extended state. In other words, the pressure sensor sheet 10 can be imparted with sensitivity only to pressure in the perpendicular direction, and the noise when the sheet is used in regions exposed to operations such as bending or extending is reduced, meaning a high degree of sensitivity can be maintained.

Examples of materials that can be used as the film substrate include polyethylene terephthalate (PET), polyimide (PI), polyvinyl chloride (PVC), polycarbonate (PC), polyethylene naphthalate (PEN) and polyether ether ketone (PEEK).

Examples of metals or the like that can be used for the vacuum deposition or sputtering or the like include Au, Ag, Cu, Cr, Ti, Al, In, Sn, or laminated layers of these metals, and examples of transparent conductive materials that may be used include ITO and PEDOT/PSS.

The first electrode sheet 1a or the second electrode sheet 1b preferably has air permeability. The expression "air permeability" means the sheets do not completely block the passage of gases. The air permeability of the first electrode sheet 1a or the second electrode sheet 1b may be achieved by forming very fine holes in the first electrode sheet 1a or the second electrode sheet 1b, or the first electrode sheet 1a or the second electrode sheet 1b may be formed on a film having air permeability.

In those cases where the pressure-sensitive conductive layer 3 is sealed on both sides by two electrode sheets having no air permeability, air is trapped inside a sealed space. As a result, when the temperature changes, this sealed air contracts and expands, generating pressure inside the sheet. This internal pressure causes changes in the resistance value of the pressure-sensitive conductive layer 3, generating measurement errors. Further, even in the step of crimping the two electrode sheets, the internal air is compressed, and the internal pressure causes measurement errors. By ensuring that each of the electrode sheets has air permeability, this type of internal pressure can be released, and measurement errors can be prevented from occurring.

It is even more preferable that in addition to the pressure-sensitive conductive layer 3 having air permeability, the first electrode sheet 1a and the second electrode sheet 1b also both have air permeability. By ensuring that both the first electrode sheet 1a and the second electrode sheet 1b have air permeability, the entire pressure sensor sheet 10 can be imparted with air permeability. As a result, when the sensor sheet is affixed to the surface of sweaty skin or the like, the pressure sensor sheet 10 is able to measure pressures acting upon the body surface without inhibiting the dissipation of moisture from the skin. This enables the development of a measurement system that causes no discomfort and suffers no defects even during long-term installation.

The thicknesses of the first electrode sheet 1a and the second electrode sheet 1b are preferably substantially equal.

If the thicknesses of the first electrode sheet 1a and the second electrode sheet 1b are substantially equal, then the strain that acts upon the pressure-sensitive conductive layer 3 when the pressure sensor is subjected to bending can be reduced as far as possible. Consequently, the occurrence of errors in the measured pressure value caused by bending of the pressure sensor sheet 10 can be suppressed.

Among the conductive fibers 2 that constitute the pressure-sensitive conductive layer 3, at least a portion of the fibers in those portions contacting the first electrode sheet 1a or the second electrode sheet 1b are preferably bound to the first electrode sheet 1a or the second electrode sheet 1b. Here, the term "bound" means that among the conductive fibers 2, those conductive fibers 2 that contact the first electrode sheet 1a or the second electrode sheet 1b adhere naturally to the first electrode sheet 1a or the second electrode sheet 1b without the application of any external energy. Specifically, when the small amount of residual solvent contained within the conductive fibers 2 formed on the first electrode sheet 1a or the second electrode sheet 1b evaporates, the shapes of the conductive fibers 2 change, and the fibers bind to the first electrode sheet 1a or the second electrode sheet 1b. If the state of the connection between the conductive fibers 2 and each of the electrode sheets is unstable, then a large amount of noise tends to occur when measurements are performed under weak pressure.

By ensuring that, among the conductive fibers 2 that constitute the pressure-sensitive conductive layer 3, at least a portion of the fibers in those portions contacting the first electrode sheet 1a or the second electrode sheet 1b are bound to the first electrode sheet 1a or the second electrode sheet 1b, the connection state becomes extremely stable. As a result, low-noise measurements can be performed using the pressure sensor sheet 10.

The conductive fibers 2 that constitute the pressure-sensitive conductive layer 3 are preferably bound, at least partially, to both the first electrode sheet 1a and the second electrode sheet 1b. This leads to a structurally stable conductive path formed by the first electrode sheet 1a, the pressure-sensitive conductive layer 3 and the second electrode sheet 1b. Further, this structural stability improves the stability of the electrical state. Accordingly, measurements with even lower noise can be performed using the pressure sensor sheet 10.

Furthermore, there is no need to use an adhesive or the like, and the pressure sensor sheet 10 can be formed extremely easily.

Figure 7:
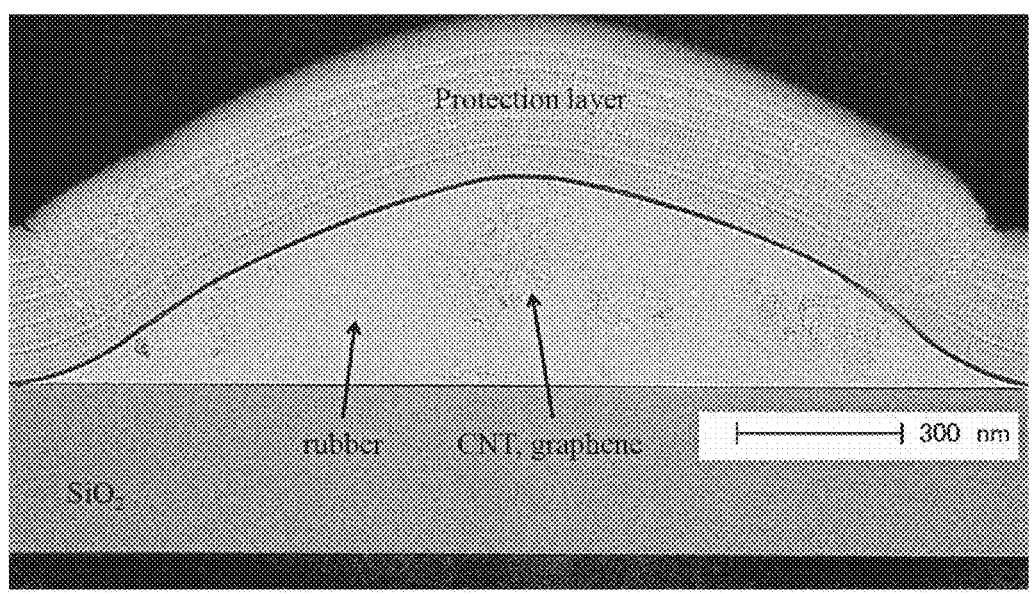
FIG. 7 is a schematic cross-sectional view of a sheet for a pressure sensor according to an embodiment of the present invention, and represents a high-resolution cross-sectional transmission electron microscope image (TEM image) illustrating conductive fibers bound to an electrode sheet upon formation of the conductive fibers on the electrode sheet by an electrospinning deposition method.

FIG. 7 is a high-resolution cross-sectional transmission electron microscope image (TEM image) illustrating conductive fibers 2 bound to a substrate when the conductive fibers 2 are sprayed onto the substrate using an electrospinning deposition method.

The pressure sensor sheet preferably also has a second pressure-sensitive conductive layer composed of tangled second conductive fibers between the pressure-sensitive conductive layer 3 and the second electrode 1b, wherein at least a portion of the conductive fibers 2 in those portions contacting the first electrode sheet 1a are preferably bound to the first electrode sheet 1a, and at least a portion of the second conductive fibers in those portions contacting the second electrode sheet 1b are preferably bound to the second electrode sheet 1b.

Because the two pressure-sensitive conductive layers are each bound to one of the electrode sheets, the state of the connection between the pressure-sensitive conductive layers and the electrodes is stable, making low-noise measurements possible. The second conductive fibers that constitute the second pressure-sensitive conductive layer may be the same as the conductive fibers described below. However, the same conductive fibers need not necessarily be used, meaning the conductive fibers and the second conductive fibers may be different.

The pressure-sensitive conductive layer and the second pressure-sensitive conductive layer are preferably adhered together. Further, the pressure-sensitive conductive layer and the second pressure-sensitive conductive layer are preferably bound together. Adhering the pressure-sensitive conductive layer and the second pressure-sensitive conductive layer improves the structural stability of the pressure sensor sheet 10. This is accompanied by greater stability in the electrical state, making low-noise measurements possible. Furthermore, binding the pressure-sensitive conductive layer and the second pressure-sensitive conductive layer enables greater stability in the electrical state without electrically inhibiting the pressure-sensitive conductive layer and the second pressure-sensitive conductive layer, making measurements with even lower noise possible.

Here, the term "adhere" may describe either a self-organized bonding described as "binding" in the present description, or some other form of bonding that uses an adhesive or the like.

The pressure-sensitive conductive layer 3 may contain not only the conductive fibers 2, but also mixed non-conductive fibers not shown in the drawings. By adjusting the mixing ratio between the conductive fibers 2 and the non-conductive fibers in the pressure-sensitive conductive layer 3, the sensitivity of the pressure sensor sheet 10 can be adjusted easily. Methods that may be used to lower the sensitivity of the pressure sensor sheet 10 and enable measurements to be performed up to high pressure include a method in which the mass ratio of the conductive material is lowered, and a method in which the conductive fibers 2 are thickened to increase the rigidity. However, reducing the mass ratio of the conductive material makes it difficult to obtain uniform resistance values. On the other hand, if the conductive fibers are thickened, then the flexibility of the pressure sensor sheet 10 tends to be lost. Accordingly, by mixing non-conductive fibers, the relationship between the pressure and the resistance value can be controlled with high precision. In other words, the pressure sensor sheet 10 can be prepared to best match the changes in pressure that are to be measured, meaning the sheet can be applied to all manner of applications.

The thickness of the pressure-sensitive conductive layer 3 is preferably smaller than the combined thickness of the first electrode sheet 1a and the second electrode sheet 1b, and is preferably smaller than the thickness of either one of the first electrode sheet 1a and the second electrode sheet 1b. In order to achieve excellent flexibility, and enable accurate pressure measurements to be performed at low noise even when the sheet is subjected to bending deformation, the rigidity of the sheet relative to bending must be suppressed to low levels, and the stress on the electrodes must also be suppressed. In the pressure sensor sheet 10 composed of the pressure-sensitive conductive layer 3 sandwiched between two electrode sheets, the sheet rigidity increases dramatically as the pressure-sensitive conductive layer 3 becomes thicker. Further, the stress at the interfaces between the conductive fibers 2 and each of the electrode sheets also increases, meaning the stable connection between the conductive fibers 2 and the electrode sheets is more easily destroyed. By ensuring that the thickness of the pressure-sensitive conductive layer 3 is smaller than the combined thickness of the two electrode sheets, the strain at the interfaces between the conductive fibers 2 and the electrode sheets is suppressed to approximately half of the strain at the electrode sheet outer surfaces, and unexpected faults during flexion of the electrode sheets and changes in the precision can be suppressed to low levels. Moreover, if the thickness of the pressure-sensitive conductive layer 3 is smaller than the thickness of either one of the first electrode sheet 1a and the second electrode sheet 1b, then strain at the connection portions between the conductive fibers 2 and each of the electrodes can be suppressed as low as possible.

The thickness of the pressure-sensitive conductive layer 3 is preferably at least 2 times, but not more than 100 times, the diameter of the conductive fibers 2. The pressure-sensitive conductive layer 3 undergoes a reduction in the resistance value when the contact between the conductive fibers 2 increases due to pressure. This contact between the conductive fibers 2 is one of the principles that enables the pressure to be measured as a resistance value. Accordingly, the thickness of the pressure-sensitive conductive layer 3 is preferably a thickness corresponding with 2 layers, or 3 layers or more, of the conductive fibers 2. In other words, the thickness of the pressure-sensitive conductive layer 3 is preferably at least 2 times the diameter of the conductive fibers 2. By increasing the number of overlapping layers of the conductive fibers 2, the number of contacts between the conductive fibers 2 increases, and localized fluctuations in the resistance value across the electrode sheets can be suppressed. On the other hand, increasing the number of stacked layers also causes an increase in the bending rigidity of the pressure sensor sheet 10 and an increase in the resistance value. By ensuring that the thickness of the pressure-sensitive conductive layer is not more than 100 times the diameter of the conductive fibers, the size of the resistance value, the measurement precision of the resistance value, and the mechanical rigidity can be kept within suitable ranges.

Furthermore, specifically, the thickness is preferably not more than 100 μm, and more preferably 10 μm or less. If the thickness of the pressure-sensitive conductive layer 3 is 100 μm or less, then the flexibility is excellent, the sheet can satisfactorily follow objects having complex shapes or moving objects, and the sheet is able to function as a high-sensitivity, flexible sheet for a pressure sensor. If the thickness is 10 μm or less, then satisfactory transparency can be maintained.

Figure 8A:
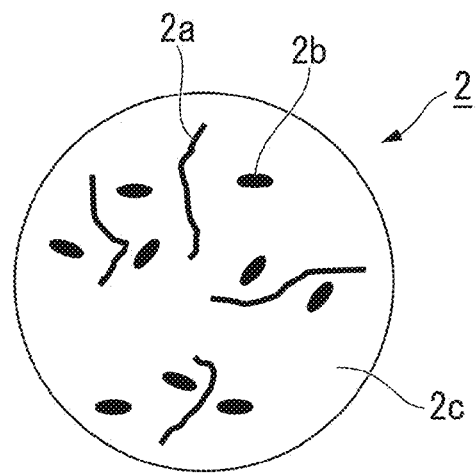
FIG. 8A is a schematic illustration of the cross-section of the conductive fibers that constitute a sheet for a pressure sensor according to an embodiment of the present invention.
Figure 8B:
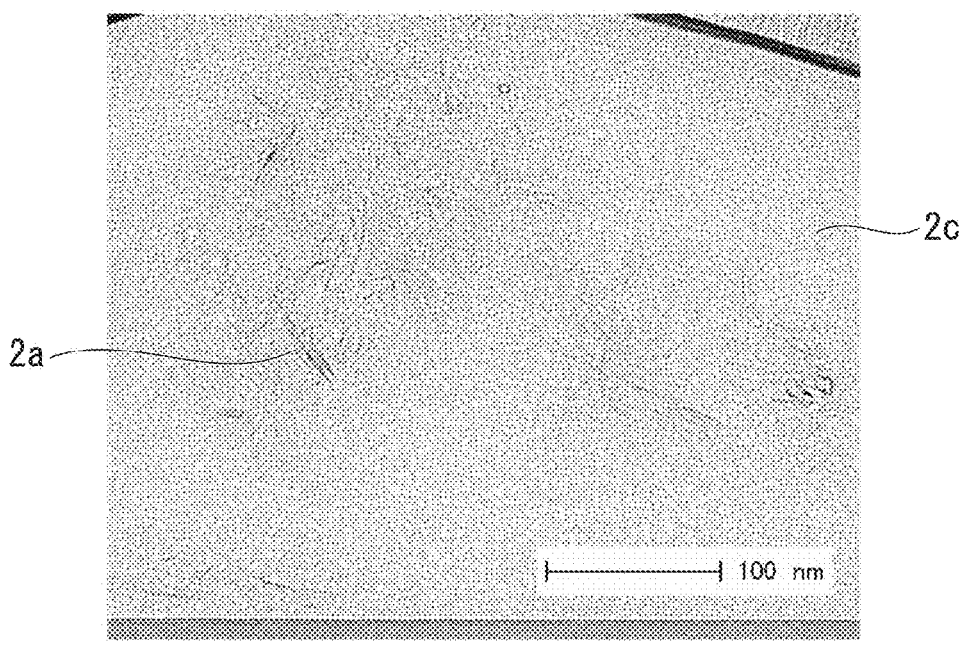
FIG. 8B is a high-resolution cross-sectional transmission electron microscope image (TEM image) of the cross-section of the conductive fibers that constitute a sheet for a pressure sensor according to an embodiment of the present invention.

FIG. 8A is a schematic illustration of the cross-section of the conductive fibers 2 that constitute the pressure sensor sheet 10 according to an embodiment of the present invention, and FIG. 8B is a high-resolution cross-sectional transmission electron microscope image (TEM image) of the conductive fibers 2 that constitute the pressure sensor sheet 10 according to an embodiment of the present invention.

The conductive fibers 2 preferably include at least a first conductive material 2a, a second conductive material 2b, and a polymer material 2c. The first conductive material 2a and the second conductive material 2b are dispersed uniformly within the conductive fibers 2. If these materials are not dispersed uniformly, then the conductive fibers 2 are unable to exhibit favorable conductivity. In the present invention, the term "conductive material" refers to a material having a conductive substance of microparticle size as a constituent element.

The first conductive material 2a is preferably a filamentous conductive material, and the second conductive material 2b is preferably a particulate (including flake-like) conductive material. The term "filamentous" means that the length of the conductive material is at least 10 times the diameter of the material.

The filamentous first conductive material 2a electrically connects particles of the particulate second conductive material 2b within the polymer material 2c. When a weak pressure acts upon the pressure sensor sheet 10, the conductivity through the filamentous first conductive material 2a changes, causing a reduction in the resistance value of the conductive fibers. As a result of this effect, the sensor sensitivity at low pressures and the stability of the sensor sensitivity can be improved. The filamentous first conductive material 2a also has a secondary effect of improving the dispersion stability of the particulate second conductive material 2b in the production process for the conductive fibers 2.

Moreover, ensuring that the mass ratio of the first conductive material 2a in the conductive fibers is smaller than the mass ratio of the second conductive material 2b enables an extremely large dynamic range for the change in resistance value upon pressure application. This is because by dispersing the second conductive material in a large mass ratio, a large reduction in the resistance value can be obtained when a high pressure acts upon the sheet.

There are no particular limitations on the first conductive material 2a. For example, carbon nanotubes, carbon nanohorns, gold nanowires, and silver nanowires and the like can be used. The first conductive material 2a is preferably carbon nanotubes or carbon nanohorns. Carbon nanotubes and carbon nanohorns have a certain degree of length, and therefore assist the conductivity between the dispersed particles of the second conductive material 2b, and it is thought that the shape of the carbon nanotubes or carbon nanohorns also assists uniform dispersion of the second conductive material 2b.

Carbon nanotubes have a structure in which a single layer or multiple layers of graphene sheet having carbon atoms arranged in a hexagonal mesh have been rounded into a circular cylindrical shape. Single-walled nanotubes (SWNT), double-walled nanotubes (DWNT) or multi-walled nanotubes (MWNT) may be used. Single-walled nanotubes (SWNT) are preferable. This is because a more uniform material with better quality stability can be obtained, and because good dispersion stability can be more easily achieved.

Carbon nanotubes can generally be produced by a laser ablation method, arc discharge method, thermal CVD method, plasma CVD method, gas phase method, or combustion method or the like, and carbon nanotubes produced using any of these types of methods may be used.

The second conductive material 2b can use materials such as graphene, gold nanoflakes, silver nanoflakes, aluminum flakes, carbon black, gold nanoparticles, silver nanoparticles and copper nanoparticles. The second conductive material 2b is preferably graphene or carbon black, as graphene and carbon black exhibit extremely high conductivity and are stable.

In terms of the combination of the first conductive material 2a and the second conductive material 2b, it is preferable that the first conductive material 2a is carbon nanotubes or carbon nanohorns, and the second conductive material 2b is graphene or carbon black. Conductive materials composed of carbon exhibit superior durability relative to oxygen and moisture, and are most suited to pressure-sensitive conductive layers 3 composed of fibers having a high specific surface area.

The mass ratio of the first conductive material 2a is preferably smaller than the mass ratio of the second conductive material 2b. The mass ratio of second conductive material 2b : first conductive material 2a is preferably within a range from 3:1 to 25:1. Provided the ratio satisfies this range, the first conductive material 2a and the second conductive material 2b can be dispersed uniformly within the polymer material 2c, and conductive fibers 2 of satisfactory conductivity can be ensured.

In particular, the mass ratio of the first conductive material 2a within the conductive fibers is preferably from 0.5 wt % to 5 wt %, and the mass ratio of the second conductive material 2b is preferably within a range from 5 wt % to 50 wt %.

Because the second conductive material 2b is the main contributor to the conductivity, ensuring that the mass ratio of the second conductive material 2b is larger than the mass ratio of the first conductive material 2a can increase the degree of change in the resistance value of the pressure sensor sheet 10, thereby increasing the sensitivity of the pressure sensor sheet 10.

If the mass ratio of the first conductive material 2a is from 1 wt % to 5 wt % and the mass ratio of the second conductive material 2b is from 15 wt % to 50 wt %, then the pressure sensor sheet 10 functions with higher sensitivity.

The mass ratio of the combination of the first conductive material 2a and the second conductive material 2b within the conductive fibers 2 is preferably from 20 wt % to 50 wt %, and more preferably from 30 wt % to 40 wt %. By altering the abundance ratio of the combination of the first conductive material 2a and the second conductive material 2b in the conductive fibers, the range of values across which the resistance value of the pressure sensor sheet 10 can change can be controlled. If the abundance ratio of the combination of the first conductive material 2a and the second conductive material 2b is lower than 20 wt %, then the conductivity when pressure is applied to the conductive fibers 2 remains low, and the sensitivity of the pressure sensor sheet 10 deteriorates. Further, if the abundance ratio of the first conductive material 2a and the second conductive material 2b exceeds 50 wt %, then it becomes impossible to uniformly disperse the first conductive material 2a and the second conductive material 2b within the conductive fibers 2.

The polymer material 2c may use a typically used elastomer such as a fluorine-based rubber, urethane-based rubber or silicon-based rubber, or may use a polymer material other than an elastomer, such as an acrylic, nylon or polyester. Among these, the use of an elastomer as the polymer material 2c of the conductive fibers 2 is preferable. Elastomers are flexible, and exhibit extremely little change in mechanical properties even when repeatedly subjected to large strain. When pressure is applied, large strain develops in the overlapping portions of the conductive fibers 2, but by using an elastomer as the base material, a combination of superior flexibility and superior durability can be achieved for the pressure sensor sheet.

If a hard substance is selected for the polymer material 2c, then there is a reduction in the amount of overlap of the conductive fibers 2 when a pressure is applied to the pressure sensor sheet 10, meaning the sensitivity of the pressure sensor sheet 10 decreases. Conversely, if a soft material is selected, then the amount of overlap of the conductive fibers 2 increases, and the sensitivity of the pressure sensor sheet 10 can be increased. Accordingly, the polymer material 2c may be altered in accordance with the intended use of the pressure sensor sheet 10.

The diameter of the conductive fibers 2 is preferably smaller than the thickness of the first electrode sheet 1a and the second electrode sheet 1b. If the diameter of the conductive fibers 2 is larger than each of the electrode sheets, then each electrode sheet becomes more prone to localized deformation that follows the surface of the conductive fibers 2. As a result, the state of contact between the conductive fibers 2 and the electrode sheets upon pressure application becomes irregular. Ensuring that the diameter of the conductive fibers 2 is smaller than the thickness of the first electrode sheet 1a and the second electrode sheet 1b enables suppression of any fluctuations in the change in the resistance value under pressure that may be caused by this type of irregularity in the contact state.

The diameter of the conductive fibers 2 is preferably from 100 nm to 10 μm, and more preferably from 200 nm to 2,000 nm. If the diameter of the conductive fibers 2 changes, then the rigidity and specific surface area of the conductive fibers and the contact surface area between the conductive fibers also change, causing a change in the sensitivity of the pressure sensor sheet 10. If the diameter is from 200 nm to 2,000 nm, then the sheet can function as a pressure sensor sheet of satisfactory sensitivity. Extremely fine conductive fibers 2 have low strength, whereas extremely thick conductive fibers 2 have high rigidity and impair the flexibility of the sensor sheet.

Accordingly, by ensuring that the diameter of the conductive fibers 2 is within the above range, a combination of favorable sensitivity and flexibility can be achieved.

(Pressure Sensor)

Figure 9:
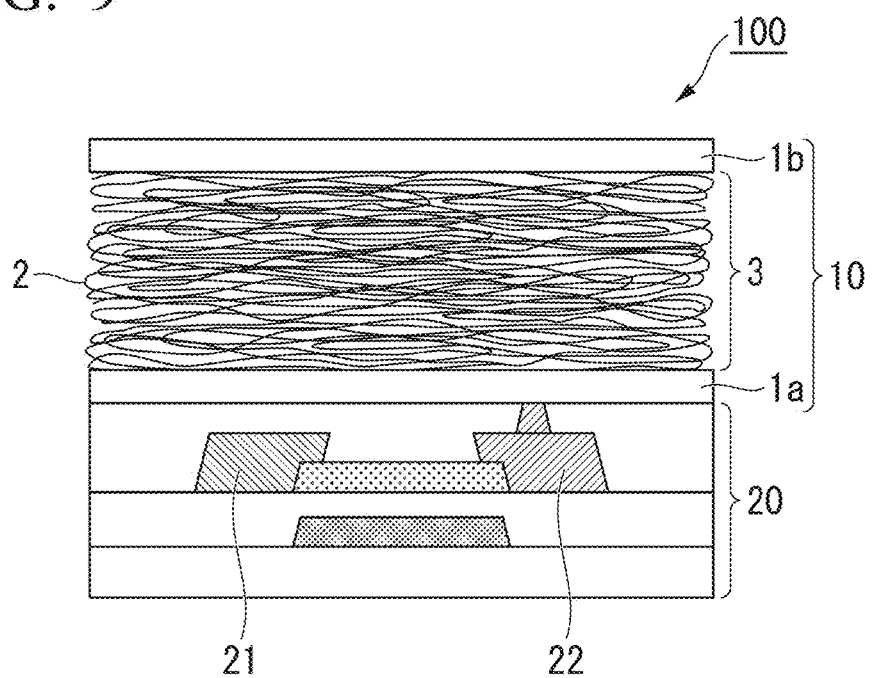
FIG. 9 is a schematic cross-sectional view of a pressure sensor according to an embodiment of the present invention.

FIG. 9 is a schematic cross-sectional view of a pressure sensor 100 according to an embodiment of the present invention. As illustrated in FIG. 9, the pressure sensor includes the pressure sensor sheet 10, and a transistor 20 connected to at least one of the first electrode sheet 1a and the second electrode sheet 1b of the pressure sensor sheet 10.

A pressure sensor sheet 10 having superior flexibility is suited to measurements on surfaces having fine undulations. Accordingly, in order to enable measurement of a pressure distribution with high spatial resolution, the electrodes are divided into a multitude of segments, with a plurality of measurement points disposed on a single pressure sensor sheet 10. In order to enable the plurality of electrode segments to be arranged in a matrix, switching of each of the electrode segments with a transistor is effective. This enables a highly functional pressure sensor to be obtained.

In the pressure sensor 100, when the resistance value of the pressure sensor sheet 10 changes, the amount of current flowing through the transistor 20 changes, and externally outputting a signal corresponding with that current value enables the sensor to function as a pressure sensor 100. For example, when a field effect transistor such as that illustrated in FIG. 9 is used as the transistor 20, pressure application causes a reduction in the resistance value of the pressure sensor sheet 10, and therefore the potential difference between a source electrode 21 and a drain electrode 22 increases, and the size of the resultant current flow also increases. If the relationship between the pressure applied to the pressure sensor sheet 10 and the current is ascertained in advance, then the amount of pressure applied to the pressure sensor 100 can be detected by reading the change in the signal output corresponding with the current.

The total thickness of the pressure sensor 100 is preferably not more than 100 μm. If the sensor is thinner than 100 μm, then it can function as an extremely flexible pressure sensor, capable of following complex shapes.

In order to ensure that the pressure sensor 100 is flexible, the transistor 20 is preferably an organic transistor. There are no particular limitations on the construction of the transistor, and for example, a field effect transistor such as that illustrated in FIG. 9 may be used.

Generally, the on-resistance of an organic transistor is in the order of MΩ, and therefore in order to cause a change in the potential difference between the source electrode 21 and the drain electrode 22, it has been thought that the change in resistance of the pressure sensor sheet 10 upon pressure application should preferably be in the order of several MΩ to 100 kΩ. As mentioned above, the pressure sensor sheet 10 according to the present embodiment exhibits changes in the resistance value across a broad range from the order of $10^2$ Ω to the order of $10^{10}$ Ω, and can therefore be used very favorably.

(Method for Producing Sheet for Pressure Sensor)

A method for producing a sheet for a pressure sensor according to one aspect of the present invention includes jetting a dispersion-based liquid containing a polymer material and a conductive material onto an electrode sheet using an electrospinning deposition method, thereby forming a pressure-sensitive conductive layer composed of tangled conductive fibers. The electrospinning method enables the conductive fibers to be bound to the first electrode sheet without using any special adhesive or performing any special process, and is therefore ideal for forming a pressure-sensitive conductive layer composed of very fine fibers.

The method for producing a sheet for a pressure sensor preferably includes a first step of mixing a first conductive material and an ionic liquid with a solvent to obtain a first dispersion system in which the first conductive material is dispersed within the solvent, a second step of mixing a second conductive material with a solvent to obtain a second dispersion system in which the second conductive material is dispersed within the solvent, a third step of mixing the first dispersion system and the second dispersion system to obtain a third dispersion system, a fourth step of adding an elastomer to the third dispersion system and stirring to obtain a fourth dispersion system, and a fifth step of jetting the fourth dispersion system onto a first electrode sheet using an electrospinning deposition method, thereby forming a pressure-sensitive conductive layer composed of tangled conductive fibers. This method for producing a sheet for a pressure sensor is described below in further detail, based on the preferred production conditions for each of the first to fifth steps.

(First Step)

In the first step, a first conductive material and an ionic liquid are mixed with a solvent to obtain a first dispersion system in which the first conductive material is dispersed within the solvent.

The solvent is preferably 4-methyl-2-pentanone. For the first conductive material, carbon nanotubes, carbon nanohorns, or metal nanowires or the like can be used. $EMIBF_4$ or $DEMEBF_4$ or the like can be used as the ionic liquid. The ionic liquid has the role of preventing aggregation of the first conductive material.

In the first step, in order to achieve efficient dispersion with no aggregation of the first conductive material, a shearing force is preferably applied. There are no particular limitations on the method used for applying the shearing force, and a ball mill, roller mill, vibration mill, or jet mill or the like may be used.

In the first step, the first conductive material is preferably added to a first solvent in an amount within a range from 0.2 wt % to 20 wt %. If the proportion of the first conductive material is less than 0.2 wt %, then achieving favorable conductivity becomes difficult. On the other hand, if the proportion of the first conductive material exceeds 20 wt %, then achieving uniform dispersion of the material is difficult.

In the first step, the ionic liquid is preferably added to the first solvent in an amount within a range from 1 wt % to 20 wt %. If the proportion of the ionic liquid is less than 1 wt %, then aggregation of the first conductive material cannot be satisfactorily suppressed. On the other hand, if the proportion of the ionic liquid exceeds 20 wt %, then the excess ionic liquid must be removed.

(Second Step)

In the second step, a second conductive material is mixed with a solvent to obtain a second dispersion system in which the second conductive material is dispersed within the solvent.

The solvent may employ the same solvent as that used in the first step. For the second conductive material, graphene, gold nanoflakes, silver nanoflakes, aluminum flakes, carbon black, gold nanoparticles, silver nanoparticles, or copper nanoparticles or the like may be used. A shearing force is preferably applied during the second step, and the same device as that used in the first step may be used.

In the second step, an ionic liquid may also be added and mixed, in a similar manner to the first step.

In the second step, the second conductive material is preferably added to a second solvent in an amount within a range from 10 wt % to 80 wt %, and more preferably within a range from 6 wt % to 8 wt %. If the proportion of the second conductive material is less than 10 wt %, then achieving favorable conductivity becomes difficult. On the other hand, if the proportion of the second conductive material exceeds 80 wt %, then achieving uniform dispersion of the material is difficult.

(Third Step)

In the third step, the first dispersion system and the second dispersion system are mixed to obtain a third dispersion system. Because the solvents used in the first step and the second step are the same, it could be considered that the first conductive material and the second conductive material could simply be added to the solvent in a single batch. However, if the first conductive material and the second conductive material are added in a single batch, then achieving uniform dispersion of each of the materials in the solvent tends to become more difficult. Accordingly, it is important that the first dispersion system and the second dispersion system are prepared separately, and are subsequently mixed together to obtain the third dispersion system.

In the third step, stirring is preferably performed to ensure thorough mixing of the first dispersion system and the second dispersion system. Mechanical stirring is adequate for this stirring, and heat or the like need not be applied.

(Fourth Step)

In the fourth step, an elastomer is added to the third dispersion system and stirred to obtain a fourth dispersion system.

A typically used elastomer such as a fluorine-based rubber, urethane-based rubber or silicon-based rubber may be used as the elastomer. Besides elastomers, other polymer materials may also be used, such as an acrylic, nylon or polyester. By appropriate selection of the elastomer material added to the third dispersion system, the viscosity of the fourth dispersion system can be changed. By changing the viscosity, the diameter and hardness of the final conductive fibers can be changed. This changes the sensitivity of the pressure sensor sheet. In other words, by altering the elastomer, the sensitivity of the pressure sensor sheet can be changed.

The mass ratio of the elastomer in the fourth dispersion system is preferably from 10 wt % to 50 wt %. The mass ratio of the first conductive material in the fourth dispersion system is preferably from 0.1 wt % to 5 wt %, and the mass ratio of the second conductive material is preferably from 0.5 wt % to 25 wt %.

If the mass ratio of the elastomer is less than 10 wt %, then solvent evaporation during the electrospinning process may take too long, and favorable fiber formation may become difficult. On the other hand, if the mass ratio of the elastomer exceeds 50 wt %, then the viscosity increases, making it difficult to achieve uniform dispersion of the first conductive material and the second conductive material.

By adjusting the ratios of the elastomer, the first conductive material and the second conductive material within these respective ranges, the sensitivity and the range of resistance values for the pressure sensor sheet can be modified.

The stirring in the fourth step is preferably performed for at least 4 hours. Adding the elastomer increases the viscosity of the dispersion system, and therefore performing thorough stirring is necessary.

(Fifth Step)

Figure 10:
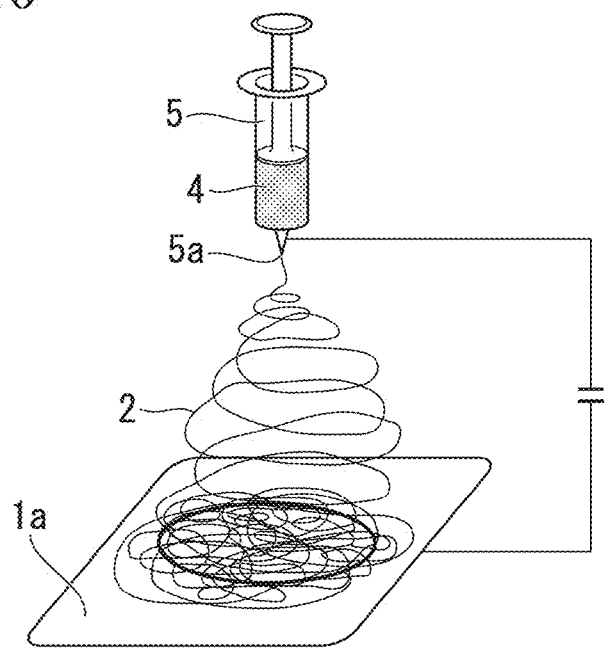
FIG. 10 is a schematic illustration illustrating an electrospinning deposition method in a fifth step of a method for producing a sheet for a pressure sensor according to an embodiment of the present invention.

In the fifth step, the fourth dispersion system is subjected to electrospinning deposition to form a pressure-sensitive conductive layer having tangled conductive fibers. The electrospinning deposition method is described using FIG. 10.

In the electrospinning deposition method used in the present embodiment, the fourth dispersion system 4 inside a syringe 5 is forced from the syringe while a high voltage is applied between the needle 5a of the syringe 5 and the first electrode sheet 1a. At this time, because of the potential difference between the needle 5a and the first electrode sheet 1a, the fourth dispersion system 4 is drawn rapidly from the syringe 5 and sprayed toward the first electrode sheet 1a. This sprayed fourth dispersion system 4 is deposited on the top of the first electrode sheet 1a in a flocculent form as the conductive fibers 2. The solvent of the fourth dispersion system 4 evaporates almost completely between the needle 5a and the first electrode sheet 1a, and therefore the majority of the solvent within the conductive fibers 2 has evaporated at the point the fibers are deposited on the first electrode sheet 1a in a flocculent form.

It is preferable that the solvent within the conductive fibers 2 deposited on the first electrode sheet 1a has not evaporated completely. By ensuring that a small amount of solvent remains within the conductive fibers 2 deposited on the first electrode sheet 1a, this residual solvent within the conductive fibers 2 evaporates on the first electrode sheet 1a. As this evaporation occurs, the shape of the conductive fibers 2 changes to a semi-cylinder loaf-like shape illustrated in FIG. 7, thereby binding together the first electrode sheet 1a and the conductive fibers 2. As a result, the first electrode sheet 1a and the conductive fibers 2 can be bound without requiring the use of extra adhesive or the like, and a pressure sensor of higher sensitivity can be produced. Accordingly, the distance between the needle 5a and the first electrode sheet 1a is preferably within a range from 10 cm to 50 cm.

The method may further include a step of jetting a dispersion-based liquid containing a polymer material and a conductive material onto the second electrode sheet using an electrospinning deposition method, thereby forming a second pressure-sensitive conductive layer composed of tangled conductive fibers, and a step of binding together the pressure-sensitive conductive layer formed on the first electrode sheet and the second pressure-sensitive conductive layer formed on the second electrode sheet. By first reliably binding conductive fibers to each of the electrode sheets, and subsequently binding together the pressure-sensitive conductive layer and the second pressure-sensitive conductive layer, a pressure sensor sheet that is structurally and electrically stable can be produced. This binding may be achieved through evaporation of the solvent, in the same manner as described above. Because the pressure-sensitive conductive layer and the second pressure-sensitive conductive layer are each composed of tangled conductive fibers, simply bringing the pressure-sensitive conductive layer and the second pressure-sensitive conductive layer into contact causes the respective conductive fibers to become tangled and bind together, producing satisfactory structural stability.

In the electrospinning deposition method, the fourth dispersion system 4 is pulled rapidly from the fine aperture of the needle 5a due to the potential difference. At this time, the fourth dispersion system 4 is subjected to shearing forces, and therefore any aggregates of the first conductive material or the second conductive material that had not been completely dispersed within the fourth dispersion system are eliminated. For this reason, the aperture of the needle 5a is preferably within a range from 0.2 mm to 2 mm.

In those cases where non-conductive fibers are mixed into the pressure-sensitive conductive layer formed on the electrode sheet, the pressure-sensitive conductive layer is preferably formed by placing the respective raw materials in two syringes, and performing simultaneous electrodeposition spinning. If the conductive fibers 2 and the non-conductive fibers are formed by sequential deposition by electrodeposition spinning, then regions with conductivity and regions without conductivity may develop within the pressure-sensitive conductive layer, resulting in a lack of uniformity in the conductivity.

It is preferable that the fifth step is performed within 24 hours of completing the fourth step. The fifth step is more preferably performed within 12 hours of the fourth step. If the fourth dispersion system is left to stand for longer than 24 hours, then the dispersed first conductive material and second conductive material may re-aggregate. If the fourth dispersion system is left to stand for longer than 12 hours, then even using the shearing forces that occur as the dispersion system passes through the fine aperture of the needle 5a, re-dispersion of the first conductive material and the second conductive material may become impossible.

EXAMPLES

Examples of the present invention are described below. The present invention is not limited solely to the following examples.

Example 1

In a first step, 0.6 wt % of carbon nanotubes and 2 wt % of an ionic liquid were mixed with a solvent of 4-methyl-2-pentanone. By subjecting this mixed liquid to shearing forces using a high-pressure jet mill homogenizer (60 MPa, Nano jet pal, JN10, manufactured by Jokoh Co., Ltd.), a first dispersion system was obtained in which the carbon nanotubes were dispersed uniformly within the solvent composed of 4-methyl-2-pentanone.

In a similar manner, in a second step, 6 wt % of graphene was mixed with a solvent of 4-methyl-2-pentanone. By subjecting this mixed liquid to shearing forces using a high-pressure jet mill homogenizer (60 MPa, Nano-jet pal, JN10, manufactured by Jokoh Co., Ltd.), a second dispersion system was obtained in which the graphene was dispersed uniformly within the solvent composed of 4-methyl-2-pentanone.

Subsequently, in a third step, the first dispersion system and the second dispersion system were stirred for 2 hours with a stirrer, thus obtaining a third dispersion system.

Then, in a fourth step, 25 wt % of a fluorine-based rubber G-912 (product name, manufactured by Daikin Industries, Ltd.) was mixed into the third dispersion system, and the resulting mixture was stirred with a stirrer for 4 hours to obtain a fourth dispersion system. At this point, the proportions of the elastomer, the carbon nanotubes and the graphene within the fourth dispersion system were 0.3 wt %, 3 wt % and 25 wt % respectively.

Finally, in a fifth step, the obtained fourth dispersion system was placed in a syringe having a needle aperture of 20 nm, and an electrode sheet was installed in a position 25 cm from the tip of the needle. A voltage of 25 kV was then applied between the needle and the electrode sheet, and the fourth dispersion system was discharged from the syringe at a rate of 10 µl/min, thus forming a pressure-sensitive conductive layer having a size of 20 cm×20 cm square and composed of tangled conductive fibers on the electrode sheet by electrospinning deposition.

The thickness of the thus obtained pressure-sensitive conductive layer was 4 µm. The electrode sheet was prepared by layering 50 nm of Au on a PET film of 1.4 µm.

The diameter of the conductive fibers was 300 nm to 400 nm, the mass ratio of the first conductive material within the conductive fibers was 1 wt %, and the mass ratio of the second conductive material was 12 wt %.

Figure 11:
FIG. 11 is a photograph of a sheet for a pressure sensor of the present invention (Example 1).

FIG. 11 is a photograph of the pressure sensor sheet of Example 1. The total thickness of this pressure sensor sheet was 7 µm.

Example 2

In Example 2, with the exception of the fifth step, a pressure sensor was prepared using the same production method as that of Example 1. In the fifth step of Example 2, in addition to the syringe containing the fourth dispersion system, another syringe was also prepared containing a solution that differed from the fourth dispersion system only in not containing any conductive material. The fourth dispersion system and the solution containing no conductive materials were then discharged simultaneously from the two syringes, forming a pressure-sensitive conductive layer having a size of 20 cm×20 cm square on an electrode sheet by electrospinning deposition. During this process, the diameters of the syringe needles, the distance between the needles and the electrode sheet, and the voltage applied between the needles and the electrode sheet were the same as Example 1.

The thickness of the thus obtained pressure-sensitive conductive layer was 4 µm, and the non-conductive fibers were mixed into the pressure-sensitive conductive layer with a ratio of conductive fibers:non-conductive fibers of 1:1. The electrode sheet was prepared by layering 50 nm of Au on a PET film of 1.4 µm. The diameter of the conductive fibers was 300 nm to 400 nm, the mass ratio of the first conductive material within the conductive fibers was 1 wt %, and the mass ratio of the second conductive material was 12 wt %. The total thickness of this pressure sensor sheet was 7 µm.

Figure 12:
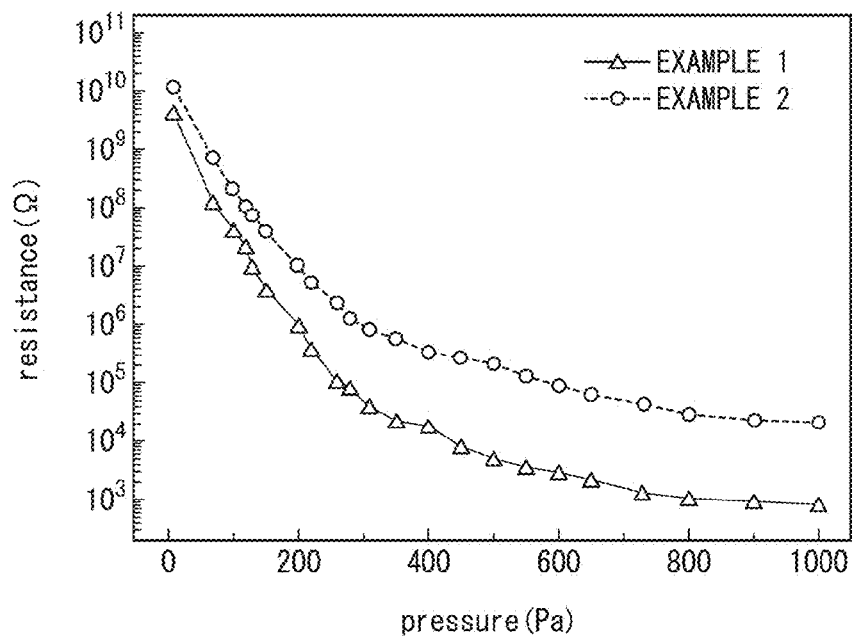
FIG. 12 is a graph illustrating the change in the resistance value relative to the pressure applied to pressure sensor sheets according to Example 1 and Example 2.

FIG. 12 is a graph illustrating the change in the resistance value relative to the pressure applied to the pressure sensor sheets of Example 1 and Example 2.

The pressure sensor sheet of Example 1 exhibited a change in the resistance value within a range from the order of $10^2$ Ω to the order of $10^{10}$ Ω, and the pressure sensor sheet of Example 2 exhibited a change in the resistance value within a range from the order of $10^4$ Ω to the order of $10^{10}$ Ω, with both pressure sensor sheets exhibiting extremely large changes in the resistance value relative to applied pressure.

Compared with the pressure sensor sheet of Example 1, the pressure sensor sheet of Example 2 exhibited a smaller change in the resistance value and different sensitivity. This is because the pressure sensor sheet of Example 2 included a mixture of conductive fibers and non-conductive fibers, resulting in a duller sensitivity compared with the pressure sensor sheet of Example 1 composed of only conductive fibers. In other words, by changing the mixing ratio between the conductive fibers and the non-conductive fibers in the pressure sensor sheet, the sensitivity of the pressure sensor sheet can easily be adjusted.

Example 3

In Example 3, with the exception of forming an organic field effect transistor on a PI film of thickness 12.5 µm, a pressure sensor was prepared using the same production method as Example 1. The thickness of the obtained pressure sensor was 29 µm.

Example 4

In Example 4, with the exception of forming an organic field effect transistor on a PI film of thickness 75 µm, a pressure sensor was prepared using the same production method as Example 1. The thickness of the obtained pressure sensor was 154 µm.

Figure 13:
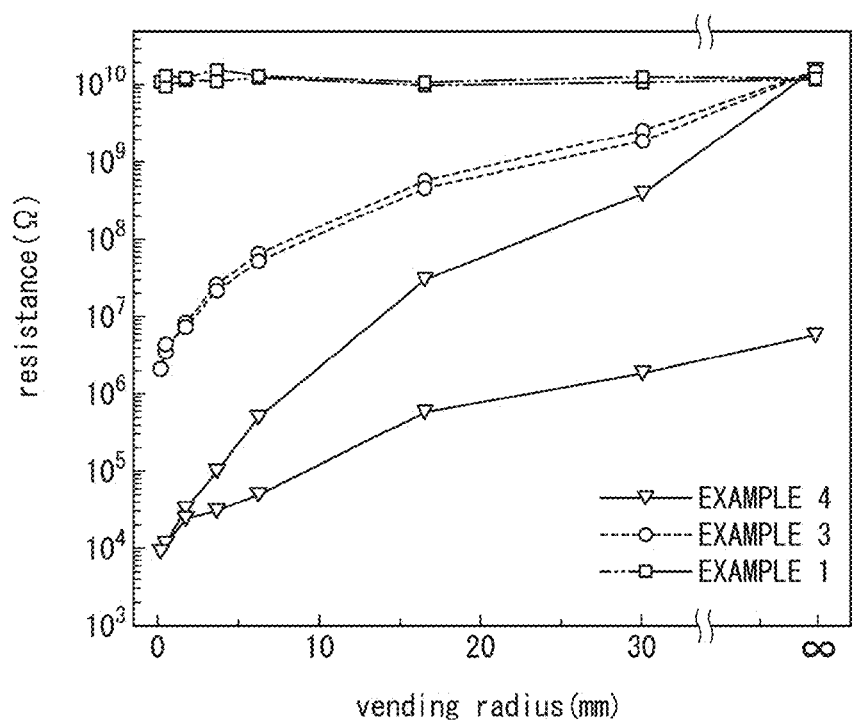
FIG. 13 is a graph illustrating the change in the resistance value relative to the bend radius, when the pressure sensor sheets of Example 1, Example 3 and Example 4 are subjected to bending.

FIG. 13 is a graph illustrating the change in the resistance value relative to the bend radius, when the pressure sensor sheets of Example 1, Example 3 and Example 4 were subjected to bending.

Examples 1 and 3 exhibited the same resistance value at the same bend radius even when exposed to bending and extending, confirming that the sheets were able to satisfactorily accommodate bending and extending and the like, and were able to function as flexible pressure sensor sheets. Among these sheets, the pressure sensor sheet of Example 1 exhibited no change in the resistance value from the extended state, even in a state where the bend radius was close to 0 mm (a state in which the pressure sensor sheet was almost folded in two). In other words, it was evident that the pressure sensor sheet undergoes almost no reaction to pressure applied parallel to the sheet. Hence, only pressure applied in a direction perpendicular to the pressure sensor sheet can be measured with good precision, meaning the sheet is particularly suitable as a pressure sensor sheet for objects having complex shapes or objects that are exposed to movements such as bending and extending.

Figure 14A:
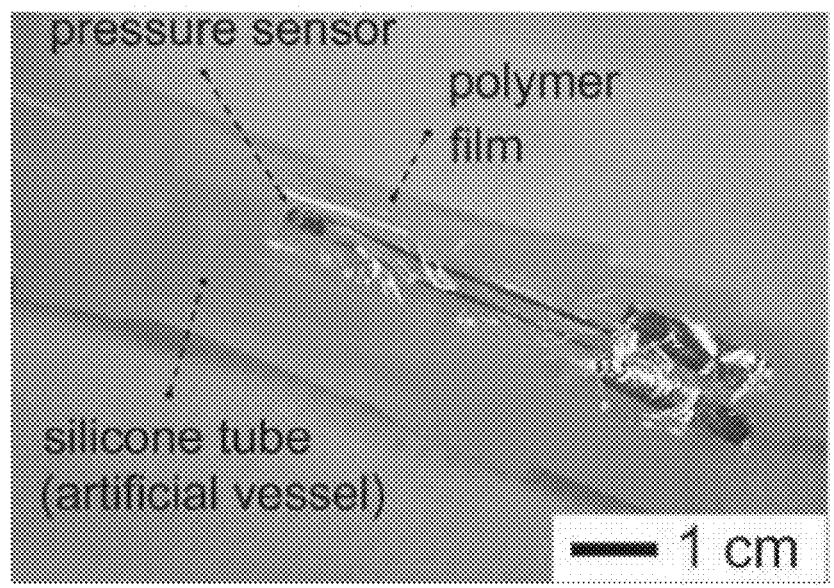
FIG. 14A is a photograph showing a pressure sensor sheet of Example 1 installed on an artificial blood vessel formed from a silicone tube.
Figure 14B:
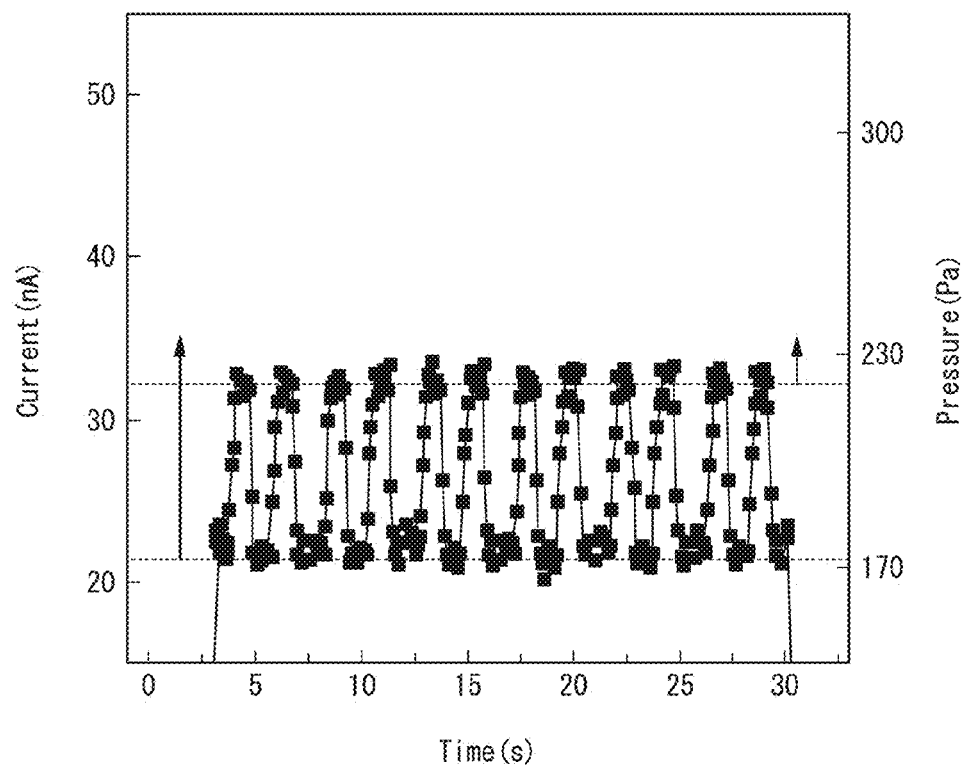
FIG. 14B illustrates the measurement results when the artificial blood vessel on which the pressure sensor sheet of Example 1 is installed is pulsed.

FIG. 14A is a photograph showing the pressure sensor sheet of Example 1 installed on an artificial blood vessel formed from a silicone tube, and FIG. 14B illustrates the measurement results when the artificial blood vessel was pulsed.

A blood vessel pulse was simulated by feeding a liquid through the artificial blood vessel at alternating pressures of 80 mmHg and 120 mmHg. As illustrated in FIG. 14B, it is clear that the resulting electric current changed in accordance with the pulses. In other words, the sheet was able to suitably follow a moving object, and was capable of measuring, with superior sensitivity, a pressure applied to the moving object.

Example 6

Example 6 differs in that the first step of Example 1 was not performed. In other words, the pressure sensor sheet of Example 6 differed from the pressure sensor sheet of Example 1 in that only graphene was used as the conductive material within the conductive fibers.

Figure 15:
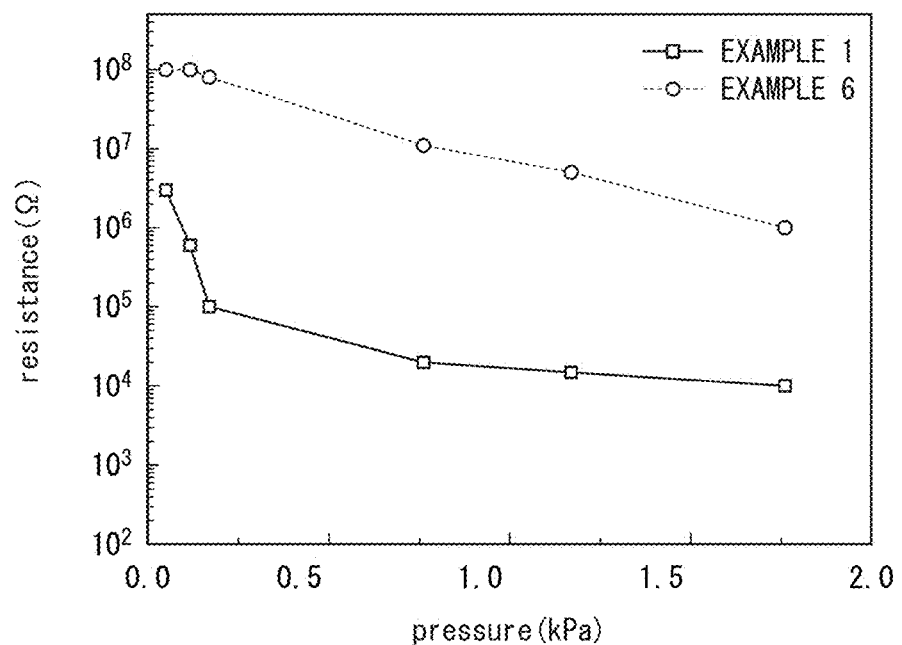
FIG. 15 is a graph illustrating the change in the resistance value relative to the pressure applied to pressure sensor sheets according to Example 1 and Example 6.

FIG. 15 is a graph illustrating the change in the resistance value relative to the pressure applied to the pressure sensor sheets according to Example 1 and Example 6. Although the pressure sensor sheet of Example 6 exhibited inferior sensitivity of the change in resistance value relative to applied pressure compared with the pressure sensor sheet of Example 1, it was still capable of functioning satisfactorily as a pressure sensor.

DESCRIPTION OF THE REFERENCE SIGNS

1a: First electrode sheet
1b: Second electrode sheet
2: Conductive fibers
2a: First conductive material
2b: Second conductive material
2c: Polymer material
3: Pressure-sensitive conductive layer
4: Fourth dispersion system
5: Syringe
5a: Needle
10: Pressure sensor sheet
20: Transistor
21: Source electrode
22: Drain electrode
100: Pressure sensor

The invention claimed is:

1. A sheet for a pressure sensor, comprising a first electrode sheet, a second electrode sheet, and a flocculent pressure-sensitive conductive layer composed of tangled conductive fibers which is disposed between the first electrode sheet and the second electrode sheet and undergoes a change in resistance value when compressed, wherein
the conductive fibers extend along a direction parallel to the two electrode sheets, and are stacked in a perpendicular direction,
the conductive fibers that constitute the pressure-sensitive conductive layer have spaces provided therebetween, and
the conductive fibers comprise a conductive material dispersed in a polymer material.

2. The sheet for a pressure sensor according to claim 1, wherein
the conductive material comprises a first conductive material and a second conductive material,
the first conductive material is a filamentous conductive material, and
the second conductive material is a particulate (including flake-like) conductive material.

3. The sheet for a pressure sensor according to claim 2, wherein
the first conductive material is carbon nanotubes or carbon nanohorns, and
the second conductive material is graphene or carbon black.

4. The sheet for a pressure sensor according to claim 2, wherein within the conductive fibers, a mass ratio of the first conductive material is smaller than a mass ratio of the second conductive material.

5. The sheet for a pressure sensor according to claim 1, wherein among the conductive fibers that constitute the pressure-sensitive conductive layer, at least a portion of the fibers in portions contacting the first electrode sheet or the second electrode sheet are bound to the first electrode sheet or the second electrode sheet.

6. The sheet for a pressure sensor according to claim 1, further comprising a second pressure-sensitive conductive layer composed of tangled second conductive fibers between the pressure-sensitive conductive layer and the second electrode sheet, wherein
at least a portion of the conductive fibers in portions contacting the first electrode sheet are bound to the first electrode sheet, and
at least a portion of the second conductive fibers in portions contacting the second electrode sheet are bound to the second electrode sheet.

7. The sheet for a pressure sensor according to claim 6, wherein the pressure-sensitive conductive layer and the second pressure-sensitive conductive layer are adhered together.

8. The sheet for a pressure sensor according to claim 1, wherein the first electrode sheet and the second electrode sheet are transparent electrodes.

9. The sheet for a pressure sensor according to claim 1, wherein the pressure-sensitive conductive layer, when viewed from a direction perpendicular to the electrode sheets, has spaces in which no conductive fibers exist.

10. The sheet for a pressure sensor according to claim 1, wherein a diameter of the conductive fibers is within a range from 100 nm to 10 μm.

11. The sheet for a pressure sensor according to claim 1, wherein a thickness of the pressure-sensitive conductive layer is smaller than a combined thickness of the first electrode sheet and the second electrode sheet.

12. The sheet for a pressure sensor according to claim 1, wherein the first electrode sheet or the second electrode sheet has air permeability.

13. The sheet for a pressure sensor according to claim 1, wherein a thickness of the pressure-sensitive conductive layer is at least 2 times, but not more than 100 times, a diameter of the conductive fibers.

14. The sheet for a pressure sensor according to claim 1, wherein a thickness of the pressure-sensitive conductive layer is within a range from 0.5 μm to 100 μm.

15. The sheet for a pressure sensor according to claim 1, wherein non-conductive fibers are mixed within the pressure-sensitive conductive layer.

16. A pressure sensor, wherein at least one electrode among the first electrode sheet and the second electrode sheet of the sheet for a pressure sensor according to claim 1 is connected to a transistor.

17. A method for producing the sheet for a pressure sensor according to claim 1, the method comprising:
jetting a dispersion-based liquid comprising a polymer material and a conductive material onto a first electrode sheet using an electrospinning deposition method, thereby forming a pressure-sensitive conductive layer composed of tangled conductive fibers.

* * * * *